US008509979B2

(12) United States Patent
Kanno et al.

(10) Patent No.: US 8,509,979 B2
(45) Date of Patent: Aug. 13, 2013

(54) CONTROL APPARATUS FOR HYBRID VEHICLE

(75) Inventors: Yoshihito Kanno, Numazu (JP); Hiroaki Ebuchi, Hadano (JP); Hirotatsu Kitabatake, Susono (JP); Hiromichi Kimura, Okazaki (JP); Yukihiko Ideshio, Nissin (JP); Tomohito Ono, Susono (JP); Hideki Sano, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/321,951

(22) PCT Filed: May 27, 2010

(86) PCT No.: PCT/JP2010/059003
§ 371 (c)(1),
(2), (4) Date: Dec. 21, 2011

(87) PCT Pub. No.: WO2010/137653
PCT Pub. Date: Dec. 2, 2010

(65) Prior Publication Data
US 2012/0095635 A1 Apr. 19, 2012

(30) Foreign Application Priority Data

May 27, 2009 (JP) .................. 2009-127703
May 27, 2009 (JP) .................. 2009-127707

(51) Int. Cl.
*B60W 20/00* (2006.01)
(52) U.S. Cl.
USPC ........................................... 701/22
(58) Field of Classification Search
USPC ............................... 701/22, 51, 54
See application file for complete search history.

(56) References Cited

U.S. PATENT DOCUMENTS

| 6,510,370 B1 * | 1/2003 | Suzuki et al. .................. 701/22 |
| 7,083,033 B2 * | 8/2006 | Yamazaki ..................... 192/84.6 |

(Continued)

FOREIGN PATENT DOCUMENTS

| JP | 09 156387 | 6/1997 |
| JP | 2003 335141 | 11/2003 |

(Continued)

OTHER PUBLICATIONS

International Search Report Issued Aug. 17, 2010 in PCT/JP10/059003 Filed May 27, 2010.

*Primary Examiner* — Thomas Tarcza
*Assistant Examiner* — Alex C Dunn
(74) *Attorney, Agent, or Firm* — Oblon, Spivak, McClelland, Maier & Neustadt, L.L.P.

(57) ABSTRACT

An object of the present invention is to detect the generation of a drag torque in a locking mechanism, in a hybrid vehicle in which a speed change mode can be changed between a fixed speed change mode and a stepless speed change mode by the action of the locking mechanism. In a hybrid vehicle, a brake mechanism is a wet multiplate brake apparatus and can selectively lock a motor generator. On the other hand, in a case where the drag torque is generated in the brake mechanism, if the motor generator is in a positive rotation state, an actual motor generator torque (first torque) is greater than a torque (less as a reaction torque, second torque) calculated from the operating condition of the hybrid vehicle by the amount of the drag torque. If the motor generator is in a negative rotation state, the first torque is less (greater as the reaction torque) than the second torque. The ECU uses this phenomenon to detect the drag torque.

11 Claims, 15 Drawing Sheets

(56) References Cited

U.S. PATENT DOCUMENTS

| | | | |
|---|---|---|---|
| 7,219,757 B2 * | 5/2007 | Tomita et al. | 180/65.275 |
| 7,270,205 B2 * | 9/2007 | Sakai et al. | 180/65.6 |
| 7,407,462 B2 * | 8/2008 | Tsukada et al. | 477/3 |
| 7,451,850 B2 * | 11/2008 | Tokunou | 180/242 |
| 7,822,524 B2 * | 10/2010 | Tabata et al. | 701/53 |
| 2005/0115755 A1 | 6/2005 | Sakai et al. | |
| 2005/0284684 A1 | 12/2005 | Tokunou | |
| 2008/0078622 A1 * | 4/2008 | Kani et al. | 185/39 |
| 2009/0159349 A1 * | 6/2009 | Ebuchi et al. | 180/65.235 |
| 2011/0231043 A1 * | 9/2011 | Ebuchi et al. | 701/22 |
| 2011/0320084 A1 * | 12/2011 | Muta et al. | 701/22 |
| 2012/0028757 A1 * | 2/2012 | Kimura et al. | 477/5 |

FOREIGN PATENT DOCUMENTS

| | | |
|---|---|---|
| JP | 2004 345527 | 12/2004 |
| JP | 2005 027071 | 1/2005 |
| JP | 2005 192284 | 7/2005 |
| JP | 2006 014451 | 1/2006 |
| JP | 2008 155891 | 7/2008 |
| JP | 2009 001172 | 1/2009 |
| JP | 2009 068615 | 4/2009 |

* cited by examiner (a)

(b)

(a)

(b)

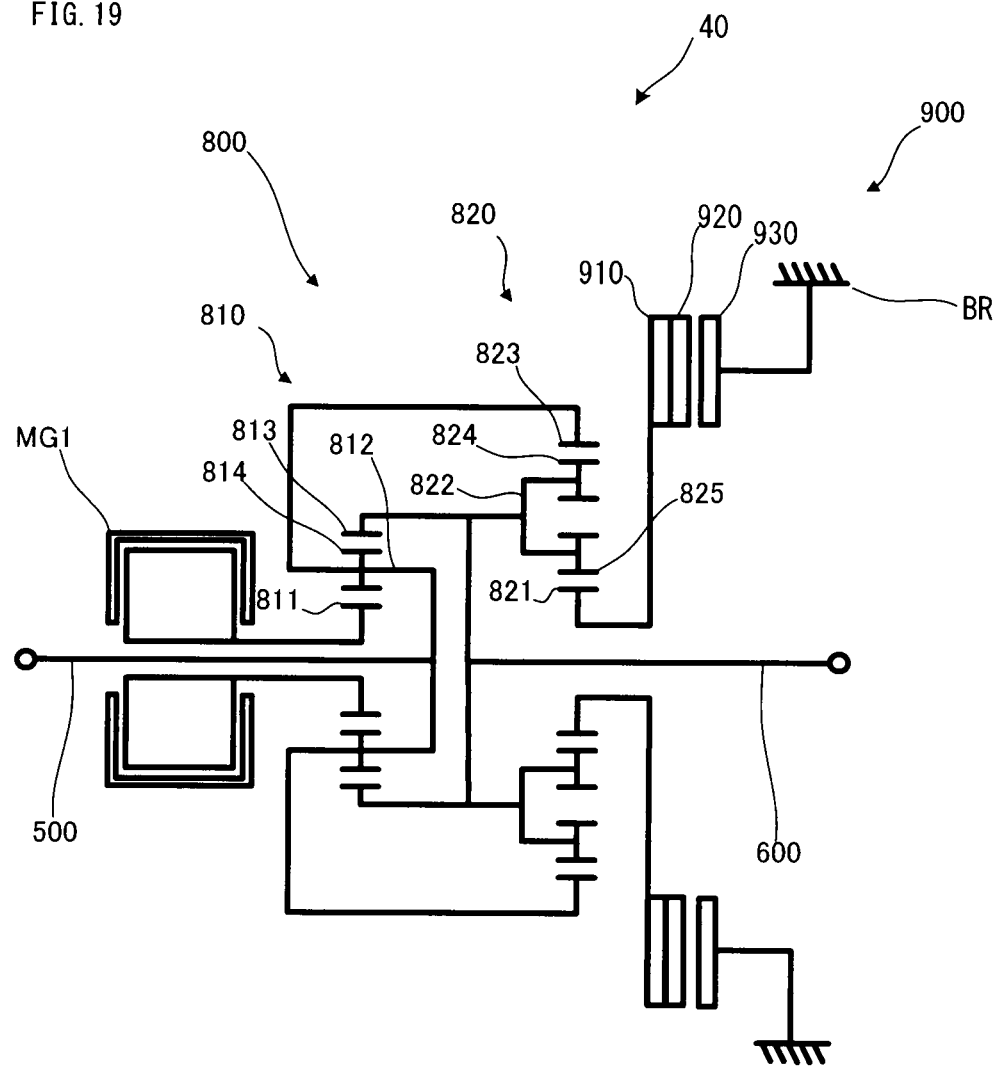

CONTROL APPARATUS FOR HYBRID VEHICLE

TECHNICAL FIELD

The present invention relates to an apparatus for controlling a hybrid vehicle provided with a locking mechanism for changing a speed change mode.

BACKGROUND ART

As this type of hybrid vehicle, there is one that can lock a generator (e.g. refer to a patent document 1). According to the hybrid vehicle disclosed in the patent document 1, it can reduce a shock in the locking by reducing the number of revolutions of a locking mechanism close to zero and then performing engagement.

Incidentally, there has been also suggested a hybrid vehicle having a fixed transmission gear ratio mode and a stepless transmission gear ratio mode (e.g. refer to a patent document 2).

PRIOR ART DOCUMENT

Patent Document

Patent document 1: Japanese Patent Application Laid Open No. Hei 9-156387
Patent document 2: Japanese Patent Application Laid Open No. 2004-345527

DISCLOSURE OF INVENTION

Subject to be Solved by the Invention

As the locking mechanism, various engagement mechanisms can be adopted. Among them, there is a locking mechanism in which engaging elements are not completely released in non-locking and cause a type of loss torque referred to as a drag torque. The generation of the drag torque of this type is similar to a type of failure in the locking mechanism; however, in a conventional technology including the disclosures in the aforementioned patent documents, the presence of the drag torque is not considered, and inevitably, a technical idea associated with the detection of the drag torque is neither disclosed nor implied.

Moreover, in a so-called two-rotational-degree-of-freedom hybrid drive apparatus for making a rotating electrical machine function as the reaction element of an internal combustion engine, whether or not the drag torque is generated, it adopts a configuration for making the rotating electrical machine converge on a desired target rotational speed. Therefore, it must be said that it is impossible to detect the presence of this type of drag torque simply from the rotational speed of the rotating electrical machine.

In other words, the conventional technology has such a technical problem that even if the drag torque is generated, it is practically hard to accurately detect it.

In view of the aforementioned problems, it is therefore an object of the present invention to provide a control apparatus for a hybrid vehicle capable of detecting the generation of the drag torque in the locking mechanism.

Means for Solving the Subject

The above object of the present invention can be achieved by a control apparatus for a hybrid vehicle, the hybrid vehicle provided with: a power element including a rotating electrical machine and an internal combustion engine; a power transmission mechanism provided with a plurality of rotational elements which mutually perform differential operation and which include a first rotational element capable of adjusting a rotational speed by using the rotating electrical machine, a second rotational element coupled with a drive shaft connected to an axle, and a third rotational element coupled with the internal combustion engine; and a locking mechanism capable of changing a state of the first rotational element between a lock state in which the first rotational element cannot rotate and a non-lock state in which the first rotational element can rotate, the hybrid vehicle being configured such that a speed change mode can be changed between a stepless speed change mode and a fixed speed change mode, the stepless speed change mode corresponding to a case where the first rotational element is in the non-lock state in which a transmission gear ratio as a ratio between a rotational speed of the internal combustion engine and a rotational speed of the drive shaft is continuously various, the fixed speed change mode corresponding to a case where the first rotational element is in the lock state in which the transmission gear ratio is fixed, the control apparatus provided with: an operating condition specifying device for specifying an operating condition of the power element; and a judging device for judging whether or not there is a drag torque in the locking mechanism on the basis of the specified operating condition.

The hybrid vehicle of the present invention is a vehicle provided at least with: the rotating electrical machine which can be configured as an electric motor generator such as a motor generator; and the internal combustion engine which can adopt various aspects regardless of its physical, mechanical, or electrical configuration such as a fuel type, a fuel supply aspect, a fuel combustion aspect, the configuration of an intake/exhaust system, and cylinder arrangement, and which is an engine capable of generating the power due to the combustion of fuel, as the power element capable of supplying power to the drive shaft.

The control apparatus for the hybrid vehicle of the present invention is an apparatus for controlling such a hybrid vehicle, and it can adopt forms of various computer systems such as various processing units like a single or a plurality of Electronic Control Units (ECUs) or the like, various controllers or microcomputer apparatuses, which can include one or a plurality of Central Processing Units (CPUs), Micro Processing Units (MPUs), various processors or various controllers, or various memory devices such as a Read Only Memory (ROM), a Random Access Memory (RAM), a buffer memory or a flush memory, as occasion demands.

The hybrid vehicle of the present invention is provided with the power transmission mechanism. The power transmission mechanism is provided with the plurality of rotational elements which can mutually perform a differential action and which include the first rotational element which is directly or indirectly coupled with the rotating electrical machine and which can adjust the rotational speed by using the rotating electrical machine, the second rotational element coupled with the drive shaft, and the third rotational element coupled with the internal combustion engine. The power transmission mechanism is a mechanism for performing various power transmissions (simply, torque transmissions) between the power element and the drive shaft in accordance with the state of each rotational element (simply including whether or not it can rotate and whether or not it is coupled with another rotational element or a fixed element, or the like) by the differential action.

Of the plurality of rotational elements provided for the power transmission mechanism, the first, second and third rotational elements constitute a two-rotational-degree-of-freedom differential mechanism in which if the rotational speeds of two of the rotational elements are always or selectively determined, the rotational speed of the remaining one rotational element is determined (incidentally, the rotational elements included in the differential mechanism are not necessarily limited to these three elements). Therefore, the rotating electrical machine can function as a reaction element for bearing a reaction torque corresponding to the torque of the internal combustion engine. The rotating electrical machine can also function as the rotational speed control mechanism of the internal combustion engine.

The hybrid vehicle of the present invention is provided with the locking mechanism which can adopt various aspects, such as a wet multiplate brake apparatus, a clutch apparatus, or an electromagnetic cam-lock type clutch apparatus, and which can change the state of the first rotational element between the lock state in which the first rotational element is fixed to a predetermined fixed element by various physical, mechanical, electrical, or magnetic engaging forces so that it cannot rotate and the non-lock state in which the first rotational element can rotate and which is a state that is not influenced at least by the engaging forces associated with the lock state. In the hybrid vehicle of the present invention, the lock state and the non-lock state correspond to the fixed speed change mode and the stepless speed change mode, respectively, which are mutually different speed change modes.

The stepless speed change mode is a speed change mode in which the transmission gear ratio as the ratio between the rotational speed of the internal combustion engine and the rotational speed of the drive shaft can be continuously (including a stepwise aspect as in being practically continuous) changed theoretically, substantially, or in the range of physical, mechanical, mechanistic, or electrical restrictions, by making the rotating electrical machine function as the rotational speed control mechanism of the internal combustion engine (i.e. the first rotational element needs to be in the non-lock state) in the aforementioned two-rotational-degree-of-freedom differential mechanism. In this case, as a preferred form, the operating point of the internal combustion engine (e.g. a point which is defined by an engine rotational speed and a torque and which is to define one operating condition of the internal combustion engine) is arbitrarily selected theoretically, substantially, or in the range of some restriction. For example, it is controlled to be an optimal fuel economy operating point at which a fuel consumption rate is minimized theoretically, substantially, or in the range of some restriction, or at which the system efficiency of the hybrid vehicle (e.g. an overall efficiency calculated on the basis of the transmission efficiency of the power transmission mechanism and the thermal efficiency of the internal combustion engine or the like) is maximized theoretically, substantially, or in the range of some restriction. The power transmission mechanism can adopt a gear mechanism such as one or a plurality of planetary gear mechanisms, as a preferred form. If it includes the plurality of planetary gear mechanisms, one portion of the rotational elements which constitute each planetary gear mechanism can be shared by the plurality of planetary gear mechanisms, as occasion demands.

The fixed speed change mode is a speed change mode in which the transmission gear ratio is uniquely or primarily defined and which is realized by maintaining the first rotational element in the lock state in which it cannot rotate, in the two-rotational-degree-of-freedom differential mechanism in the same manner. In other words, if the first rotational element is in the lock state, the rotational speed of the first rotational element (i.e. zero) and the rotational speed of the second rotational element indicating a rotational state unique to the vehicle speed uniquely define the rotational speed of the remaining third rotational element. At this time, if the first rotational element is directly coupled with the rotating electrical machine, then, the rotating electrical machine has zero rotation and a state referred to as so-called MG1 locking is realized. If the first rotational element is coupled with the rotating electrical machine via another rotational element which has a differential relation with the first rotational element, the rotational speed of the rotating electrical machine is fixed to one value determined in accordance with their gear ratio. In the latter case, preferably, it is possible to realize a state referred to so-called O/D locking in which the rotational speed of the internal combustion engine is less than the rotational speed of the drive shaft. In any case, the fixed speed change mode is preferably selected in order to avoid the generation of an inefficient electrical path which is referred to power circulation and which can reduce the system efficiency of an entire hybrid drive apparatus including the power element and the power transmission mechanism.

On the other hand, the locking mechanism of the present invention can adopt a state in which the first rotational element is not completely released from the fixed element (hereinafter, referred to as an "intermediate state" as occasion demands), as the intermediate state between the lock state and the non-lock state in terms of its structure. In the intermediate state, the first rotational element receives the drag torque as a type of braking torque to a varying degree from the fixed element fixed in the lock state, and the rotation of the first rotational element is interrupted to some extent. The drag torque is namely a loss torque which can reduce a torque transmitted to the drive shaft, and it is a factor which reduces the system efficiency of the hybrid drive apparatus. The presence of the drag torque as described above is extremely undesirable in view of the role of the locking mechanism which can be installed originally for the purpose of the high efficiency of the hybrid drive apparatus.

Thus, in the control apparatus for the hybrid vehicle of the present invention, the drag torque in the locking mechanism (i.e. the drag torque acting on the first rotational element) is detected in the following manner; namely, according to the control apparatus for the hybrid vehicle of the present invention, in its operation, the operating condition of the power element is specified by the operating condition specifying device, and the judging device judges whether or not there is the drag torque on the basis of the specified operating condition.

Here, in the power transmission mechanism, the differential relation is established between the rotational elements, and the drag torque acting on the first rotational element can influence the operating conditions of not only the rotating electrical machine which function as the rotational speed adjusting device of the first rotational element but also the internal combustion engine coupled with the third rotational element which has the differential relation with the first rotational element. More specifically, the operating condition of the internal combustion engine or the rotating electrical machine necessary to maintain the torque or the rotational speed required for the drive shaft coupled with the second rotational element which has the differential relation with them varies depending on the presence or absence of this type of drag torque.

The "operating condition of the power element" means various operating conditions determined to be what can cause a significant difference in accordance with the presence or absence of the drag torque, on the basis of experiments, experiences, theories, simulations or the like in advance. For example, it includes the torque of the rotating electrical machine necessary to maintain one rotational speed, the degree of a change in the rotational speed of the rotating electrical machine or the internal combustion engine, or the like.

Therefore, the judging device can preferably judge whether or not the drag torque is generated, on the basis of the operating condition of the rotating electrical machine or the internal combustion engine. In other words, according to the control apparatus for the hybrid vehicle of the present invention, it is possible to detect the drag torque in the locking mechanism.

Further to that, the present invention realizes the accurate detection of the drag torque (1) by giving thought to the necessity of the detection of this type of drag torque in view of the fact that the drag torque in the locking mechanism can reduce the system efficiency of the hybrid vehicle in practice, (2) by focusing on that the presence or absence of this type of drag torque gives a significant difference to the operating conditions of the rotating electrical machine and the internal combustion engine which are coupled with the first rotational element and the third rotational element which has the differential relation with the first rotational element, respectively, and (3) by using such a technical idea that the operating conditions of the rotating electrical machine and the internal combustion engine are used as index values for detecting the drag torque on the basis of the focus.

Therefore, it is clearly advantageous in that it is possible to take practically useful measures, such as accurately detecting the generation of the drag torque, thereby, for example, informing the driver of the generation of the drag torque, encouraging the driver to take a proper measure, or optimizing the control condition of the hybrid vehicle, over any technical ideas that do not take into account the presence of this type of drag torque and any technical ideas that do not include the indication of the necessity of the detection of the drag torque and its specific detecting method even if it takes into account the presence of the drag torque.

In one aspect of the control apparatus for the hybrid vehicle of the present invention, the operating condition specifying device specifies a torque of the rotating electrical machine as a first torque which is one operating condition from a control amount of the rotating electrical machine and specifies a torque of the rotating electrical machine as a second torque which is another operating condition from an operating condition of the hybrid vehicle which correlates with the torque of the rotating electrical machine, and the judging device judges whether or not there is the drag torque on the basis of the specified first and second torques.

According to this aspect, the operation condition specifying device firstly specifies the torque of the rotating electrical machine as the first torque which is one operating condition of the power element from the control amount of the rotating electrical machine (e.g. a target torque, various drive conditions such as a drive current, a drive voltage, or a drive power, or the like) and secondly specifies the torque of the rotating electrical machine as the second torque which is another operating condition of the power element from the operating condition of the hybrid vehicle (e.g. a required output, a required torque, or the like) which is defined in advance such that it correlates with the torque of the rotating electrical machine. In other words, as a qualitative expression, the operation condition specifying device specifies the actual torque of the rotating electrical machine (i.e. the first torque) and the torque of the rotating electrical machine in a normal case which is the way it should be (i.e. the second torque).

The first torque is equivalent to the actual torque of the rotating electrical machine, and the second torque is the ideal or theoretical target torque of the rotating electrical machine (an actual target torque varies, as occasion demands, due to rotation F/B control for maintaining the rotational speed of the rotating electrical machine at a target rotational speed, or the like). In the normal state in which there is no drag torque in the locking mechanism, the first torque and the second toque highly likely match or substantially match. On the other hand, if there is the drag torque in the locking mechanism, the first torque and the second torque deviate from each other. By using this phenomenon, it is possible to preferably judge whether or not the drag torque is generated.

Here, the internal combustion engine tends to have a lower accuracy of controlling the torque than the rotating electrical machine; for example, the actual torque and the target torque tend to deviate from each other in accordance with a combustion state which is influenced by various control conditions such as an engine temperature, a fuel injection amount, fuel injection timing, and ignition timing. The torque variation (the deviation between the target torque and the actual torque) generated on the internal combustion engine side is also a factor which causes the deviation between the target torque and the actual torque, as in the drag torque.

However, the variation in the first torque (i.e. the actual torque of the rotating electrical machine) caused by matters on the internal combustion engine side does not change depending on the rotational direction of the rotating electrical machine (whether it is in a positive rotational direction or a negative rotational direction). In other words, if the torque of the internal combustion engine is shifted to an increase side, the first torque becomes smaller (if a torque acting in the same direction as that of the torque of the internal combustion engine is set to be a positive torque, the reaction torque is a negative torque; namely, the reaction torque becomes smaller as its absolute value becomes larger). If the torque of the internal combustion engine is shifted to a reduction side, the first torque becomes larger (i.e. the reaction torque decreases). On the other hand, the drag torque always acts in a direction of interrupting the rotation of the first rotational element. Thus, if there is the drag torque in the locking mechanism, an influence of the drag torque on the first torque varies depending on the rotational direction of the rotating electrical machine.

Therefore, according to this aspect, the variation in the torque on the internal combustion engine side and the drag torque can be separated, and the drag torque can be detected accurately.

Incidentally, in this aspect, the judging device may judge that the drag torque is generated in each of a case where the specified first torque is greater than the specified second torque if the rotating electrical machine is in a positive rotation state and a case where the specified first torque is less than the second torque if the rotating electrical machine is in a negative rotation state.

In the case where the drag torque is generated, if the rotating electrical machine is in the positive rotation state, the drag torque acts in the same direction as that of the reaction torque. Thus, the absolute value of the reaction torque required becomes smaller, and the first torque is greater than the second torque (i.e. the torque to be outputted from the rotating electrical machine in the normal case where the drag torque is not generated). On the other hand, if the rotating electrical machine is in a negative rotation state, the direction of the action of the reaction torque and the direction of the action of the drag torque are opposite to each other. Thus, the absolute value of the reaction torque increases by the amount of the drag torque, and the first torque becomes less than the second torque. Therefore, the judging device can accurately detect the generation of the drag torque in accordance with such a criterion.

In another aspect of the control apparatus for the hybrid vehicle of the present invention, the operating condition specifying device specifies a state of convergence on a target rotational speed of at least one of the rotating electrical machine and the internal combustion engine as the operating condition, and the judging device judges whether or not there is the drag torque on the basis of the specified state of convergence.

If the drag torque is generated, the state of convergence on the target rotational speed of the rotating electrical machine or the internal combustion engine associated with a change in the operating condition of the hybrid vehicle (which simply means a convergence speed, a convergence time, or the like, but which may be a transient time waveform until the convergence, or the like) changes in comparison with that in the normal case where the drag torque is not generated. Therefore, according to this aspect, it is possible to accurately detect the drag torque on the basis of the state of convergence.

In another aspect of the control apparatus for the hybrid vehicle of the present invention, the control apparatus is further provided with a first controlling device for controlling the rotating electrical machine to reduce a reaction torque corresponding to a torque of the internal combustion engine in a steady driving period of the hybrid vehicle, the operating condition specifying device specifies amount of a change in the rotational speed of the internal combustion engine associated with the reduction in the reaction torque as the operating condition, and the judging device judges whether or not there is the drag torque on the basis of the specified amount of the change in the rotational speed associated with the reduction in the reaction torque.

If the reaction torque is reduced, the rotational speed of the internal combustion engine increases by the differential action between the rotational elements; however, the amount of the change associated with the increase in the rotation changes depending on the presence or absence of the drag torque. According to this aspect, it is judged whether or not there is the drag torque on the basis of the amount of the change in the rotational speed of the internal combustion engine associated with the reduction in the reaction torque. Thus, it is possible to accurately detect the drag torque.

Incidentally, the change in the rotational speed in reducing the reaction torque is influenced by the rotational direction of the rotating electrical machine, as in the mutual relation between the first and second torques described above. In other words, if the rotating electrical machine is in the positive rotation state, the degree of the increase in the rotational speed of the internal combustion engine in the case of reducing the reaction torque is smaller than that in the normal case by the amount of the drag torque. On the other hand, if the rotating electrical machine is in the negative rotation state, the degree of the increase in the rotational speed of the internal combustion engine is larger than that in the normal case by the amount of the drag torque. Therefore, ideally speaking, when the judging device judges whether or not the drag torque is generated, the rotational direction of the rotating electrical machine is desirably understood or known. However, in any rotational direction of the rotating electrical machine, there is no difference in that the rotational speed of the internal combustion engine changes due to the drag torque. When it comes to the detection of the drag torque, as long as the behavior of the internal combustion engine in the normal case is understood or known on the basis of experiments, experiences, theories, simulations or the like in advance, the rotational direction of the rotating electrical machine is not necessarily understood or known.

In another aspect of the control apparatus for the hybrid vehicle of the present invention, the operating condition specifying device specifies amount of a change in the rotational speed of the internal combustion engine in cranking as the operating condition, and the judging device judges whether or not there is the drag torque on the basis of the specified amount of the change in the rotational speed in the cranking.

According to this aspect, it is possible to detect the drag torque by using that the internal combustion engine can be cranked by the rotating electrical machine. Therefore, it is possible to increase the detection frequency of the drag torque.

Incidentally, the amount of the change in the rotational speed in the cranking as described above is influenced by the rotational area of the rotating electrical machine, as in the mutual relation between the first and second torques described above. In other words, if the hybrid vehicle adopts the configuration that another rotating electrical machine is coupled with the drive shaft and so-called EV driving can be performed by virtue of this another rotating electrical machine, the internal combustion engine can be required of its start not only while the vehicle is not moving but also while the vehicle is moving. In the cranking from the vehicle stop state, the rotating electrical machine is in the positive rotation state. In the cranking from the vehicle moving state, the rotating electrical machine is in the negative rotation state. Therefore, if the drag torque is generated, in the former case, one portion of a cranking torque is canceled by the drag torque, and a net cranking torque decreases, and the change in the rotational speed of the internal combustion engine becomes slow. On the other hand, in the latter case, the cranking torque is assisted by the drag torque. Thus, the net cranking torque increases, and the change in the rotational speed of the internal combustion engine becomes larger.

Therefore, ideally, when the judging device judges whether or not the drag torque is generated, the rotational direction of the rotating electrical machine is desirably understood or known. However, in any rotational direction of the rotating electrical machine, there is no difference in that the rotational speed of the internal combustion engine in the cranking changes due to the drag torque. When it comes to the detection of the drag torque, as long as the behavior of the internal combustion engine in the normal case is understood or known on the basis of experiments, experiences, theories, simulations or the like in advance, the rotational direction of the rotating electrical machine is not necessarily understood or known.

In another aspect of the control apparatus for the hybrid vehicle of the present invention, it is provided with: a shift amount specifying device for specifying amount of a shift in the operating condition of the power element caused by the drag torque, with respect to a normal case, if it is judged that the drag torque is generated; and a second controlling device for controlling at least one of a reduction torque and a cranking torque of the internal combustion engine in accordance with the specified amount of the shift.

According to this aspect, the amount of the shift in the operating condition of the power element caused by the drag torque is specified by the shift amount specifying device, and the reduction torque (i.e. a torque in stopping the internal combustion engine) or the cranking torque or both of them are controlled in accordance with the specified amount of the shift. Therefore, it is possible to prevent that a time length in which the rotational speed of the internal combustion engine remains in a resonance band increases due to the drag torque at the start or stop of the internal combustion engine, and it is possible to effectively suppress the vibration of the vehicle.

In one aspect of the control apparatus for the hybrid vehicle of the present invention in which the state of convergence on the target rotational speed of at least one of the rotating electrical machine and the internal combustion engine is specified as the operating condition, it is provided with: a third controlling device for controlling a torque of the rotating electrical machine in accordance with a deviation between the rotational speed of the internal combustion engine and the target rotational speed such that the rotational speed of the rotating electrical machine converges on the target rotational speed in a situation in which the stepless speed change mode is selected; and a calculating device for calculating the drag torque on the basis of a feedback value of the torque of the rotating electrical machine calculated when the rotating electrical machine is controlled in accordance with the deviation and a value of an inertial torque caused by inertia of a rotational inertia system including the power element when the rotating electrical machine is controlled in accordance with the deviation.

In the situation in which the stepless speed change mode is selected, the rotational speed feedback control of the rotating electrical machine is performed by the controlling device. In other words, in the rotational speed feedback control, the torque of the rotating electrical machine is controlled in accordance with the deviation between the rotational speed of the rotating electrical machine and the target rotational speed such that the rotational speed of the rotating electrical machine converges on the target rotational speed. At this time, the target rotational speed of the rotating electrical machine is set in a form in which it corresponds to the target operating point of the internal combustion engine. The target torque of the rotating electrical machine is determined in accordance with the gear ratio between the rotational elements by the differential action of the rotational elements in the power transmission mechanism. This is an ideal value in a steady state.

On the other hand, in a transitional period including immediately after the change from the fixed speed change mode to the stepless speed change mode, in the course that the rotational speed of the rotating electrical machine (whose initial value is zero in the configuration that the first rotational element is coupled with the rotating electrical machine) increases toward the target rotational speed, there arises a need to compensate the inertia (rotational inertia) of the power element. In other words, if no measures are taken, one portion of the torque of the rotating electrical machine is canceled by this inertia torque, and the shaft torque of the rotating electrical machine decreases. The shaft torque of the rotating electrical machine is namely the reaction torque of the torque of the internal combustion engine, and the reduction thereof causes a reduction in the output torque of the drive shaft. Therefore, in order to make the rotating electrical machine converge on the target rotational speed quickly and accurately while avoiding the reduction in the drive shaft torque of this type, it is necessary to compensate the inertia torque of the power element.

Thus, when the controlling device performs the rotational speed feedback control of the rotating electrical machine, the torque of the rotating electrical machine is corrected by using the torque feedback value determined in accordance with the deviation of the rotational speed described above. The torque of the rotating electrical machine corrected by using the torque feedback value is namely the actual torque of the rotating electrical machine determined in a different system from a system for an ideal or standard torque determined from the target torque of the internal combustion engine. Both of the torques balance in a situation in which the rotational speed of the rotating electrical machine converges on the target rotational speed.

Thus, in this aspect, the drag torque in the locking mechanism (i.e. the drag torque acting on the first rotational element) is estimated by the calculating device in the following manner; namely, the drag torque in the locking mechanism is calculated on the basis of the aforementioned feedback value of the torque of the rotating electrical machine calculated when the rotating electrical machine is controlled in accordance with the deviation and the value of the inertial torque (i.e. the aforementioned inertia torque) caused by the inertia of the rotational inertia system including the power element when the rotating electrical machine is controlled in accordance with the deviation.

As described above, when the rotational speed feedback control is performed on the rotating electrical machine by the controlling device, the feedback of the torque according to the deviation of the rotational speed is performed. The torque feedback value associated with this torque feedback compensates the inertia torque of the rotational inertia system. If there is the drag torque in the locking mechanism, the drag torque interrupts the rotation of the rotating electrical machine if it acts in the opposite direction to that of the torque of the rotating electrical machine. If it acts in the same direction, the drag torque can assist the rotation of the rotating electrical machine. In any case, the drag torque influences the rotational state of the rotating electrical machine.

On the other hand, the inertia torque of the rotational inertia system including the power element can be uniquely or primarily derived once the rotational speed is determined if the inertia of the rotational inertia system is understood or known on the basis of experiments, experiences, theories, simulations or the like in advance. If there is a significant difference between the inertial torque and a torque corresponding to the torque feedback value, it can be considered to be caused almost by the drag torque in the locking mechanism. Thus, the calculating device can accurately calculate the drag torque as a result of subtracting one from the other.

In one aspect of the control apparatus for the hybrid vehicle of the present invention which is provided with the calculating device, it is further provided with a judging device for judging the locking mechanism on the basis of the calculated drag torque.

In view of the configuration that the drag torque can be calculated by the calculating device, the calculated drag torque can be used for the judgment of the state of the locking mechanism. The practical aspect of the judgment of the judging device is not limited in any manner; however, whichever judging process is undergone, according to this aspect, the calculated drag torque can be preferably used for the preferable operation of the hybrid vehicle. Incidentally, the judging device may judge that the locking mechanism is broken if the calculated drag torque is not zero, or it may judge that the locking mechanism is broken if the calculated drag torque is greater than or equal to a fixed or variable threshold value.

Incidentally, in this aspect, the judging device may judge that the locking mechanism is in a failure state if the calculated drag torque is greater than or equal to a predetermined value.

In this case, it is possible to judge that the locking mechanism is in a failure state, relatively simply, which is useful from the viewpoint of the control load of the judging device. Incidentally, the "failure state" is a state defined as classification in terms of control, and it does not necessarily indicate only a state in which the operations of the locking mechanism are remarkably limited. For example, the practical meaning indicated by the failure state can be variably controlled depending on the setting of the predetermined value, simply from a relatively light state in which the driver is to be informed of the state to a relatively heavy state in which retreat or escape running is required immediately.

In another aspect of the control apparatus for the hybrid vehicle of the present invention which is provided with the calculating device, it is further provided with a correcting device for correcting an output torque of the drive shaft in accordance with the calculated drag torque.

In the aforementioned two-rotational-degree-of-freedom differential mechanism in the power transmission mechanism, a direct torque divided to the drive shaft out of the torque of the internal combustion engine is calculated from the reaction torque of the rotating electrical machine. Thus, if there is a difference between the direct torque and a torque actually outputted from the rotating electrical machine due to the fact that the shaft torque which appears on a shaft actually coupled with the rotating electrical machine includes the drag torque, then, the accuracy of estimating the direct torque decreases, and the drive shaft torque varies with respect to a required value.

In this regard, according to this aspect, since the output torque of the drive shaft is corrected in accordance with the calculated drag torque by the correcting device, it is possible to maintain the drive shaft torque at a required torque all the time. Moreover, the vehicle vibration and a reduction in drivability due to the torque variation of the drive shaft are suppressed, preferably.

In another aspect of the control apparatus for the hybrid vehicle of the present invention which is provided with the calculating device, it is further provided with a selecting device for selecting one of the stepless speed change mode and the fixed speed change mode on the basis of the calculated drag torque.

According to this aspect, since one of the stepless speed change mode and the fixed speed change mode can be selected on the basis of the calculated drag torque, it is possible to avoid a reduction in fuel economy or efficiency when the hybrid vehicle performs the retreat running.

Incidentally, in this aspect, the selecting device may select a mode having a higher system efficiency of the hybrid vehicle from the stepless speed change mode and the fixed speed change mode.

As described above, by selecting the speed change mode with the system efficiency as a judgment index, it is possible to reduce an influence of a loss by the drag torque as much as possible and to make the hybrid vehicle perform the retreat running, efficiently.

In another aspect of the control apparatus for the hybrid vehicle of the present invention which is provided with the calculating device, it is further provided with another rotating electrical machine which is different from the rotating electrical machine and which can perform power input/output with the drive shaft.

According to this aspect, even if one portion of the torque of the internal combustion engine which appears on the drive shaft is insufficient for the required torque, the required torque can be maintained by virtue of the assist of the torque from another power source. Moreover, if a predetermined permission condition is satisfied or in similar cases, so-called EV driving of the hybrid vehicle can be also performed by using only a power supply from the other power source, which is practically useful.

The operation and other advantages of the present invention will become more apparent from the embodiments explained below.

BRIEF DESCRIPTION OF DRAWINGS

FIG. 19 is a schematic configuration diagram conceptually showing the structure of a hybrid drive apparatus in a fourth embodiment of the present invention.

MODE FOR CARRYING OUT THE INVENTION

Embodiments of the Invention

Hereinafter, various preferred embodiments of the present invention will be explained with reference to the drawings.

First Embodiment

Configuration of Embodiment

Figure 1:
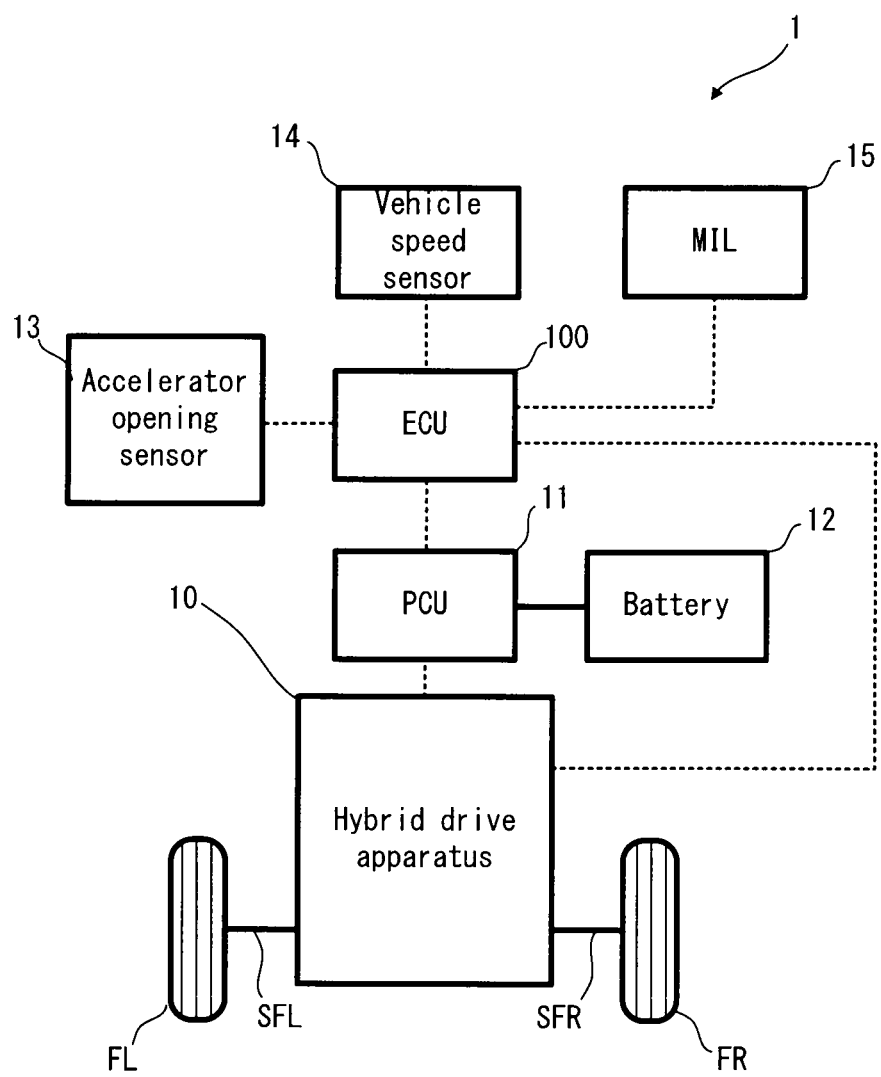
FIG. 1 is a schematic configuration diagram conceptually showing the structure of a hybrid vehicle in a first embodiment of the present invention.

Firstly, with reference to FIG. 1, an explanation will be given on the structure of a hybrid vehicle 1 in a first embodiment of the present invention. FIG. 1 is a schematic configuration diagram conceptually showing the structure of the hybrid vehicle 1.

In FIG. 1, the hybrid vehicle 1 is provided with: an ECU 100; a Power Control Unit (PCU) 11; a battery 12; an accelerator opening sensor 13; a vehicle speed sensor 14; and a hybrid drive apparatus 10. The hybrid vehicle 1 is one example of the "hybrid vehicle" of the present invention.

The ECU 100 is provided with a Central Processing Unit (CPU), a Read Only Memory (ROM), a RAM and the like. The ECU 100 is an electronic control unit capable of controlling the operations of each part of the hybrid vehicle 1. The ECU 100 is one example of the "control apparatus for the hybrid vehicle" of the present invention. The ECU 100 can perform drag torque detection control described later, in accordance with a control program stored in the ROM. Incidentally, the ECU 100 is a unified or one-body electronic control unit configured to function as one example of each of the "operating condition specifying device", the "judging device", the "first controlling device", the "shift amount specifying device", and the "second controlling device" of the present invention, and all the operations of the respective devices are performed by the ECU 100. However, the physical, mechanical and electrical configurations of each of the devices of the present invention are not limited to this. For example, each of the devices may be configured as various computer systems such as a plurality of ECUs, various processing units, various controllers or microcomputer apparatuses.

The PCU 11 includes a not-illustrated inverter which can convert direct-current (DC) power extracted from the battery 12 to alternating-current (AC) power and supply it to a motor generator MG1 and a motor generator MG2 described later and which can convert AC power generated by the motor generator MG1 and the motor generator MG2 to DC power and supply it to the battery 12. The PCU 11 is a control unit capable of controlling the input/output of the electric power between the battery 12 and each motor generator, or the input/output of the electric power between the motor generators (i.e. in this case, the electric power is transferred between the motor generators without via the battery 12). The PCU 11 is electrically connected to the ECU 100, and the operations of the PCU 11 are controlled by the ECU 100.

The battery 12 is a chargeable storage battery device which can function as an electric power source associated with the electric power for the power running of the motor generator MG 1 and the motor generator MG2.

The accelerator opening sensor 13 is a sensor capable of detecting an accelerator opening degree Ta which is the operation amount of a not-illustrated accelerator pedal of the hybrid vehicle 1. The accelerator opening sensor 13 is electrically connected to the ECU 100, and the detected accelerator opening degree Ta is referred to by the ECU 100 with a constant or irregular period.

The vehicle speed sensor 14 is a sensor capable of detecting a vehicle speed V of the hybrid vehicle 1. The vehicle speed sensor 14 is electrically connected to the ECU 100, and the detected vehicle speed V is referred to by the ECU 100 with a constant or irregular period.

Figure 2:
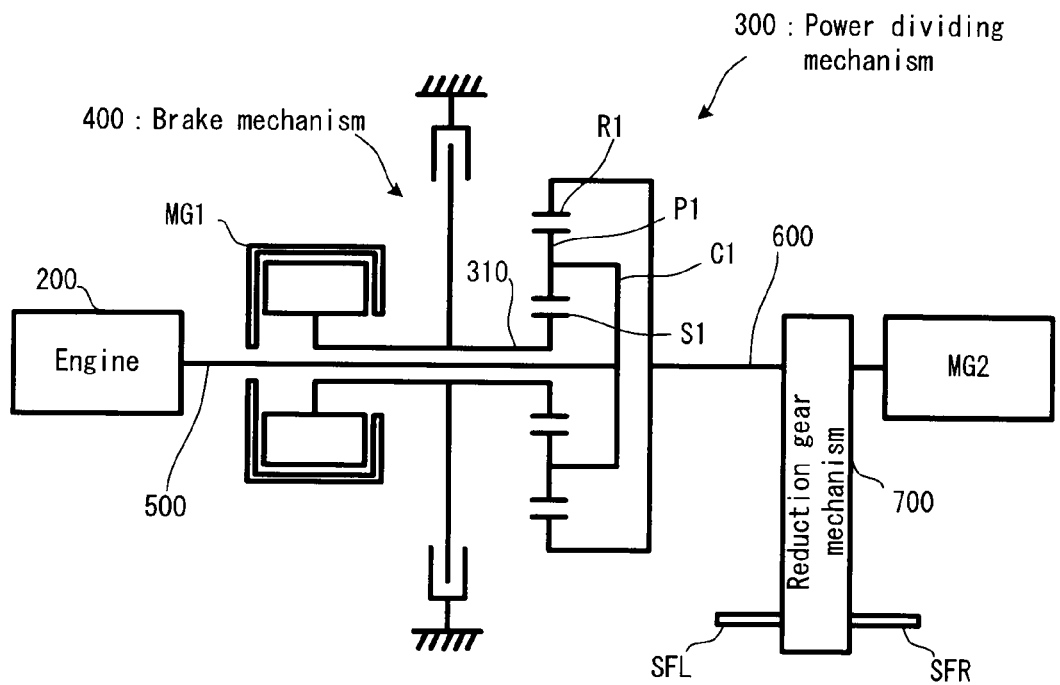
FIG. 2 is a schematic configuration diagram conceptually showing the structure of a hybrid drive apparatus in the hybrid vehicle in FIG. 1.

The hybrid drive apparatus 10 is a power unit which functions as a power train of the hybrid vehicle 1. Now, with reference to FIG. 2, the detailed structure of the hybrid drive apparatus 10 will be explained. FIG. 2 is a schematic configuration diagram conceptually showing the structure of the hybrid drive apparatus 10. Incidentally, in FIG. 2, portions overlapping those of FIG. 1 will carry the same reference numerals, and the explanation thereof will be omitted as occasion demands.

In FIG. 2, the hybrid drive apparatus 10 is provided with an engine 200, a power dividing mechanism 300, a motor generator MG1 (hereinafter abbreviated to as a "MG1" as occasion demands), a motor generator MG2 (hereinafter abbreviated to as a "MG2" as occasion demands), a brake mechanism 400, an input shaft 500, a drive shaft 600, and a reduction gear mechanism 700.

Figure 3:
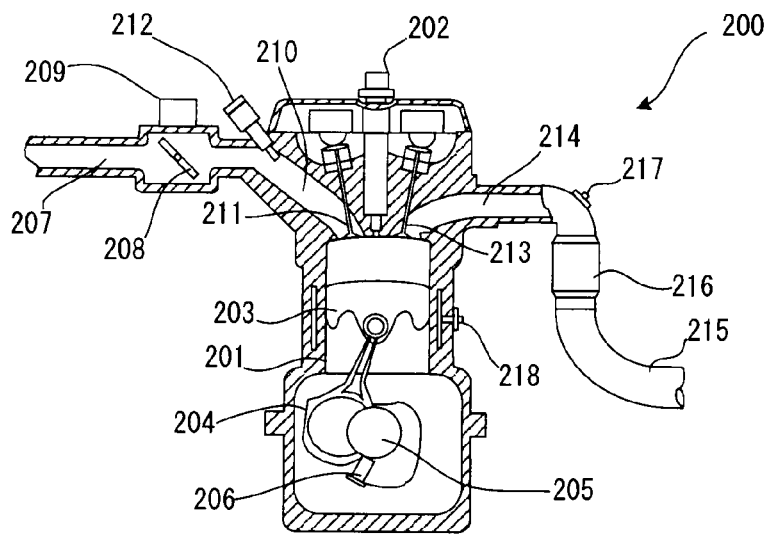
FIG. 3 is a schematic diagram showing one cross-sectional structure of an engine provided for the hybrid drive apparatus in FIG. 2.

The engine 200 is a gasoline engine as one example of the "internal combustion engine" of the present invention, and it functions as a main power source of the hybrid vehicle 1. Now, with reference to FIG. 3, the detailed structure of the engine 200 will be explained. FIG. 3 is a schematic diagram showing one cross-sectional structure of the engine 200. Incidentally, in FIG. 3, portions overlapping those of FIG. 1 and FIG. 2 will carry the same reference numerals, and the explanation thereof will be omitted as occasion demands. Incidentally, the "internal combustion engine" of the present invention includes, for example, a two-cycle or four-cycle reciprocating engine or the like and conceptually includes an engine configured to have at least one cylinder and to extract a force generated when an air-fuel mixture including various fuels, such as gasoline, light oil or alcohol, as a driving force via a physical or mechanical transmitting device, such as a piston, a connecting rod, and a crankshaft, as occasion demands, in a combustion chamber within the cylinder. As long as the concept is satisfied, the structure of the internal combustion engine of the present invention is not limited to that of the engine 200 but may have various aspects.

In FIG. 3, the engine 200 is configured to burn the air-fuel mixture through an ignition operation performed by an ignition apparatus 202 in which one portion of an ignition plug or spark plug (whose reference numeral is omitted) is exposed to the combustion chamber in a cylinder 201. At the same time, the engine 200 is configured to convert reciprocating motion of a piston 203 generated in accordance with an explosive power caused by the combustion, to rotational motion of a crankshaft 205 as an engine output shaft, via a connecting rod 204.

In the vicinity of the crankshaft 205, a crank position sensor 206 for detecting the rotational position of the crankshaft 205 (i.e. a crank angle) is placed. The crank position sensor 206 is electrically connected to the ECU 100 (not illustrated). In the ECU 100, an engine rotational speed NE of the engine 200 is calculated on the basis of a crank angle signal outputted from the crank position sensor 206.

Incidentally, the engine 200 is an in-line four-cylinder engine in which four cylinders 201 are aligned in a direction perpendicular to the plane of the paper. Since the structures of the individual cylinders 201 are equal to each other, only one cylinder 201 will be explained in FIG. 2. Moreover, the number of the cylinders and the arrangement form of the respective cylinders in the internal combustion engine of the present invention are not limited to those of the engine 200 but can adopt various aspects in a range satisfying the aforementioned concept. For example, the engine 200 may be of a six-cylinder, eight-cylinder, or 12-cylinder engine type, or of a V-type, a horizontally-opposed type, or the like.

In the engine 200, the air sucked from the exterior is supplied through an intake tube 207 and an intake port 210 to the inside of the cylinder 201 in the opening of an intake valve 211. On the other hand, a fuel injection valve of an injector 212 is exposed in the intake port 210, and it is configured to inject or spray the fuel to the intake port 210. The fuel injected or sprayed from the injector 212 is mixed with the intake air before or after the valve opening timing of the intake valve 211, to thereby make the aforementioned air-fuel mixture.

The fuel is stored in a not-illustrated fuel tank and is supplied to the injector 212 through a not-illustrated delivery pipe by the action of a not-illustrated feed pump. The air-fuel mixture burned in the cylinder 201 becomes an exhaust gas and is supplied to an exhaust tube 215 through an exhaust port 214 in the opening of an exhaust valve 213 which opens or closes in conjunction with the opening or closing of the intake valve 211.

On the other hand, on the upstream side of the intake port 210 in the intake tube 207, there is disposed a throttle valve 208 for adjusting an intake air amount associated with the intake air supplied through a not-illustrated cleaner. The throttle valve 208 is configured such that the driving state thereof is controlled by a throttle valve motor 209, which is electrically connected to the ECU 100. Incidentally, the ECU 100 basically controls the throttle valve motor 209 to obtain a throttle opening degree according to the opening degree of an accelerator pedal not illustrated (i.e. the aforementioned accelerator opening degree Ta); however, it can also adjust the throttle opening degree without a driver's will through the operation control of the throttle valve motor 209. In other words, the throttle valve 208 is configured as a kind of electronically-controlled throttle valve.

In the exhaust tube 215, a ternary or three-way catalyst 216 is placed. The ternary catalyst 216 is configured to purify each of CO (carbon monoxide), HC (hydrocarbon), and NOx (nitrogen oxide) emitted from the engine 200. Incidentally, a form that can be adopted by the catalyst apparatus of the present invention is not limited to such a ternary catalyst. For example, instead of or in addition to the ternary catalyst, various catalysts such as a NSR catalyst (or NOx storage-reduction catalyst) or an oxidation catalyst may be placed.

In the exhaust tube 215, there is placed an air-fuel ratio sensor 217 capable of detecting the exhaust air-fuel ratio of the engine 200. Moreover, in a water jacket placed in a cylinder block for accommodating the cylinder 201, a water temperature sensor 218 is disposed in order to detect a coolant temperature associated with a coolant or cooling water (LLC) circulated and supplied to cool the engine 200. Each of the air-fuel ratio sensor 217 and the water temperature sensor 218 is electrically connected to the ECU 100, and the detected air-fuel ratio and the detected coolant temperature are grasped or confirmed by the ECU 100 with a constant or irregular detection period.

Back in FIG. 2, the motor generator MG1 is an electric motor generator as one example of the "rotating electrical machine" of the present invention. The motor generator MG1 is provided with: a power running function for converting electrical energy into kinetic energy; and a regeneration function for converting the kinetic energy into the electrical energy. The motor generator MG2 is an electric motor generator having a larger body than the motor generator MG1. As in the motor generator MG1, the motor generator MG2 is provided with: the power running function for converting the electrical energy into the kinetic energy; and the regeneration function for converting the kinetic energy into the electrical energy. Incidentally, each of the motor generators MG1 and MG2 is configured as, for example, a synchronous electric motor generator, and it is provided with: a rotor having a plurality of permanent magnets on the outer circumferential surface; and a stator around which a three-phase coil for forming a rotating magnetic field is formed; however, it may have another configuration.

The power dividing mechanism 300 is a power transferring apparatus as one example of the "power transmission mechanism" of the present invention, provided with: a sun gear S1 as one example of the "first rotational element" of the present invention, disposed in the central part; a ring gear R1 as one example of the "second rotational element" of the present invention, concentrically disposed on the outer circumference of the sun gear S1; a plurality of pinion gears P1, each of which is disposed between the sun gear S1 and the ring gear R1 and each of which revolves around the sun gear S1 on the outer circumference of the sun gear S1 while rotating on its axis; and a carrier C1 as one example of the "third rotational element" of the present invention, for supporting the rotating shaft of each pinion gear.

Here, the sun gear S1 is coupled with the rotor of the MG1 via a sun gear shaft 310, and its rotational speed is equivalent to a MG1 rotational speed Ng which is the rotational speed of the MG1. Moreover, the ring gear R1 is connected to the not-illustrated rotor of the MG2 via the drive shaft 600 and the reduction gear mechanism 700, and its rotational speed is equivalent to a MG2 rotational speed Nm which is the rotational speed of the MG2. Moreover, the carrier C1 is coupled with the input shaft 500 coupled with the aforementioned crankshaft 205 of the engine 200, and its rotational speed is equivalent to the engine rotational speed NE of the engine 200. Incidentally, in the hybrid drive apparatus 10, each of the MG1 rotational speed Ng and the MG2 rotational speed Nm is detected with a constant period by a rotation sensor such as a resolver and is transmitted to the ECU 100 with a constant or irregular period.

On the other hand, the drive shaft 600 is coupled with drive shafts SFR and SFL (i.e. those drive shafts are one example of the "axle" of the present invention) for driving a right front wheel FR and a left front wheel FL, respectively, which are the drive wheels of the hybrid vehicle 1, via the reduction gear mechanism 700 including various reduction gears such as a differential. Therefore, a motor torque Tm supplied from the motor generator MG2 to the drive shaft 600 is transmitted to each drive shaft via the reduction gear mechanism 700, and a driving force from each drive wheel transmitted via each drive shaft is inputted to the motor generator MG2 via the reduction gear mechanism 700 and the drive shaft 600 in the same manner. In other words, the MG2 rotational speed Nm has a unique relation with the vehicle speed V of the hybrid vehicle 1.

The power dividing mechanism 300 can divide an engine torque Te supplied to the input shaft 500 via the crankshaft 205 from the engine 200 under the aforementioned configuration, into the sun gear S1 and the ring gear R1 at a predetermined ratio (a ratio corresponding to a gear ratio between the gears) by using the carrier C1 and the pinion gears P1, and it can divide the power of the engine 200 into two systems.

In order to make it easier to understand the operations of the power dividing mechanism 300, a gear ratio $\rho$ is defined as the number of the teeth of the sun gear S1 with respect to the number of the teeth of the ring gear R1. In the action of the engine torque Te on the carrier C1 from the engine 200, a torque Tes which appears on the sun gear shaft 310 is expressed by the following equation (1), and a torque Ter which appears on the drive shaft 600 is expressed by the following equation (2).

$$Tes = -Te \times \rho/(1+\rho) \quad (1)$$

$$Ter = Te \times 1/(1+\rho) \quad (2)$$

Incidentally, the configuration in the embodiment of the "power transmission mechanism" of the present invention is not limited to that of the power dividing mechanism 300. For example, the power transmission mechanism of the present invention may be provided with a plurality of planetary gear mechanisms, wherein each of the plurality of rotational elements provided for one planetary gear mechanism is coupled with respective one of the plurality of rotational elements provided for another planetary gear mechanism as occasion demands to form a unified or one-body differential mechanism. Moreover, the reduction gear mechanism 700 in the embodiment merely reduces the rotational speed of the drive shaft 600 in accordance with a reduction gear ratio set in advance; however, apart from this type of reduction gear apparatus, the hybrid vehicle 1 may be provided with a step transmission provided with a plurality of transmission steps or gear stages having a plurality of clutch mechanisms and a brake mechanism as its components. For example, there may be provided a planetary gear mechanism equivalent to the power dividing mechanism 300 between the motor generator MG2 and the reduction gear mechanism 700. The rotor of the MG2 may be coupled with the sun gear of the planetary gear mechanism, and the ring gear R1 may be coupled with the ring gear of the planetary gear mechanism. At the same time, the carrier may be fixed in a non-rotatable manner. By these, the MG2 rotational speed Nm may be reduced.

The brake mechanism 400 is a known hydraulically-driven wet muliplate brake apparatus as one example of the "locking mechanism" of the present invention, having such a structure that one brake plate is coupled with the sun gear S1 and the other brake plate is physically fixed. The brake mechanism 400 is connected to a not-illustrated hydraulic drive apparatus, and the brake plate on the sun gear side is pressed against the brake plate on the fixed side due to the supply of a hydraulic pressure from the hydraulic drive apparatus. The brake mechanism 400 is configured to selectively change the state of the sun gear S1 between a lock state in which the sun gear S1 cannot rotate and a release state in which the sun gear S1 can rotate. Incidentally, the hydraulic drive apparatus of the brake mechanism 400 is electrically connected to the ECU 100, and its operations are superior-controlled by the ECU 100.

Incidentally, the brake mechanism 400 is one example of practical aspects which can be adopted by the "locking mechanism" of the present invention. The locking mechanism of the present invention can adopt not only the brake mechanism 400 as a wet multiplate brake apparatus but also an electromagnetic dog clutch mechanism, an electromagnetic cam-lock mechanism, or the like, as a preferred form.

Operations in Embodiment

<Selection of Speed Change Mode by MG1 Locking>

Figure 4:
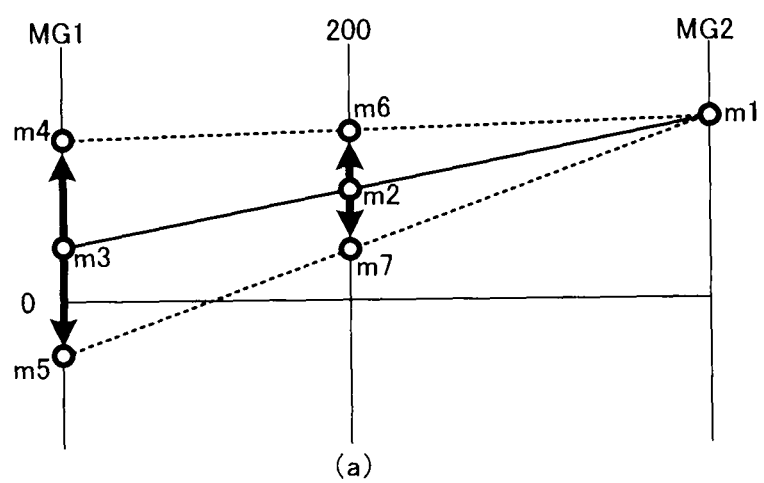
FIG. 4 are operational nomograms explaining an operating condition of each part in the hybrid drive apparatus in FIG. 2.
Figure 4:
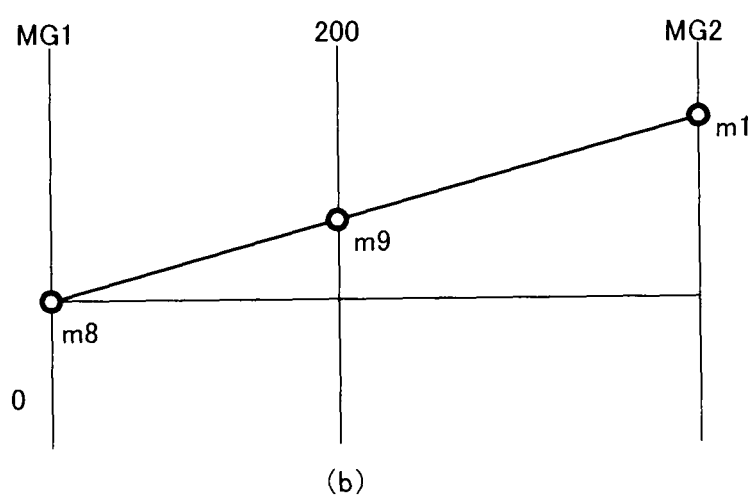

The hybrid vehicle 1 in the embodiment can select a fixed speed change mode or a stepless speed change mode as the speed change mode of the present invention, in accordance with the state of the sun gear S1. Now, with reference to FIG. 4, the speed change mode of the hybrid vehicle 1 will be explained. FIG. 4 are operational nomograms of the hybrid drive apparatus 10. Incidentally, in FIG. 4, portions overlapping those of FIG. 2 will carry the same reference numerals, and the explanation thereof will be omitted as occasion demands.

In FIG. 4(*a*), the vertical axis shows the rotational speed, and the horizontal axis shows the motor generator MG1 (uniquely meaning the sun gear S1), the engine 200 (uniquely meaning the carrier C1) and the motor generator MG2 (uniquely meaning the ring gear R1) from the left in order. Here, the power dividing mechanism 300 is a planetary gear mechanism having two rotational degrees of freedom, and if the rotational speeds of two elements out of the sun gear S1, the carrier C1, and the ring gear R1 are determined, the rotational speed of the remaining one element is inevitably determined. In other words, on the operational nomogram, the operating state of each rotational element can be expressed by one operational nomogram which corresponds to one operating state of the hybrid drive apparatus 10 in a one-to-one manner. Incidentally, hereinafter, a point on the operational nomogram will be expressed by an operating point mi (i is a natural number), as occasion demands. In other words, one operating point mi corresponds to one rotational speed.

In FIG. 4(*a*), it is assumed that the operating point of the MG2 is an operating point m1. In this case, if the operating point of the MG1 is an operating point m3, the operating point of the engine 200 coupled with the carrier C1 as the remaining one rotational element is an operating point m2. At this time, if the operating point of the MG1 is changed to an operating point m4 and an operating point m5 while the rotational speed of the drive shaft 600 is maintained, then, the operating point of the engine 200 is changed to an operating point m6 and an operating point m7, respectively.

In other words, in this case, by setting the motor generator MG1 as a rotational speed control apparatus, the engine 200 can be operated at a desired operating point. The speed change mode corresponding to this state is the stepless speed change mode. In the stepless speed change mode, the operating point of the engine 200 (the operating point in this case is defined by the combination of the engine rotational speed and the engine torque Te) is controlled to an optimal fuel economy operating point at which the fuel consumption rate of the engine 200 is basically minimized. Incidentally, it is obvious that the MG1 rotational speed Ng needs to be variable in the stepless speed change mode. Thus, if the stepless speed change mode is selected, the drive state of the brake mechanism 400 is controlled such that the sun gear S1 is in the release state.

Here, further to that, in the power dividing mechanism 300, in order to supply the torque Ter corresponding to the engine torque Te described above to the drive shaft 600, it is necessary to supply a reaction torque having the same magnitude as that of and having the reversed sign (i.e. negative torque) of the aforementioned torque Tes which appears on the sun gear shaft 310 in accordance with the engine torque Te, from the motor generator MG1 to the sun gear shaft 310. In this case, in the operating points in a positive rotation area such as the operating point m3 or the operating point m4, the MG1 is in a power generation state having a positive rotation negative torque. In other words, in the stepless speed change mode, by making the motor generator MG1 (uniquely meaning the sun gear S1) function as a reaction element, one portion of the engine torque Te is supplied to the drive shaft 600, and electric power is generated in one portion of the engine torque Te distributed to the sun gear shaft 310. If an engine direct torque is insufficient for a torque required for the drive shaft 600, the torque Tm is supplied to the drive shaft 600 from the motor generator MG2, as occasion demands, by using this generated electric power.

On the other hand, for example, in an operating condition in which the engine rotational speed NE is low although the MG2 rotational speed Nm is high, such as in high-speed light-load driving, the MG1 has the operating point in a negative rotation area such as the operating point m5. In this case, the motor generator MG1 outputs a negative torque as the reaction torque of the engine torque Te, and it is in a negative-rotation negative-torque state and in a power-running state. In other words, in this case, a torque Tg from the motor generator MG1 is transmitted to the drive shaft 600 as the drive torque of the hybrid vehicle 1.

On the other hand, the motor generator MG2 is in a negative-torque state because it absorbs a torque which is outputted to the drive shaft 600 and which is excessive for a required torque. In this case, the motor generator MG2 is in a positive-rotation negative-torque state and in the power generation state. In this state, there is an inefficient electrical path referred to as so-called power circulation, such as using a driving force from the MG1 to generate electricity on the MG2 and power-running driving the MG1 due to the generated power. In a situation in which the power circulation takes place, the transmission efficiency of the hybrid drive apparatus 10 is likely reduced, and the system efficiency of the hybrid drive apparatus 10 is likely reduced.

Thus, in the hybrid vehicle 1, in an operating area set in advance such that the power circulation can take place, the sun gear S1 is controlled to be in the aforementioned lock state by the brake mechanism 400. The situation is shown in FIG. 4(*b*). When the brake mechanism 400 becomes in the lock state, i.e. when the sun gear S1 is locked, inevitably, the motor generator MG1 also becomes in the lock state, and the operating point of the MG1 becomes an operating point m8 at which the rotational speed is zero. Thus, the operating point of the engine 200 becomes an operating point m9, and the engine rotational speed NE is uniquely determined from the MG2 rotational speed Nm which uniquely means the vehicle speed V (i.e. a transmission gear ratio becomes constant). As described above, the speed change mode corresponding to the case where the MG1 is in the lock state is the fixed speed change mode.

In the fixed speed change mode, the reaction torque of the engine torque Te with which the motor generator MG1 is originally to be burdened can be replaced by the physical braking force of the brake mechanism 400. In other words, it is not necessary to control the motor generator MG1 to be either in the power generation state or in the power-running state, and it is possible to stop the motor generator MG1. Therefore, basically, it is no longer necessary to operate the motor generator MG2 either, and the MG2 becomes in a so-called idling state. In the end, in the fixed speed change mode, the drive torque that appears on the drive shaft 600 becomes only a direct component (refer to the equation (2)) divided to the drive shaft 600 side by the power dividing mechanism 300, out of the engine torque Te, and the hybrid drive apparatus 10 only performs mechanical power transmission. Thus, its transmission efficiency is improved.

<Details of Drag Torque Detection Control>

In the brake mechanism 400, in a situation in which the sun gear S1 is to be in the release state, in some cases, an engaging force acting between the brake plates is not completely deleted, resulting in a drag torque. The drag torque is a type of loss torque in which the generation thereof is originally not considered, and it is a so-called functional fault of the hybrid vehicle 1. Thus, the detection of the drag torque is important in operating the hybrid vehicle 1 efficiently. Therefore, in the hybrid vehicle 1, the drag torque detection control is performed by the ECU 100, and the drag torque can be detected accurately.

Figure 5:
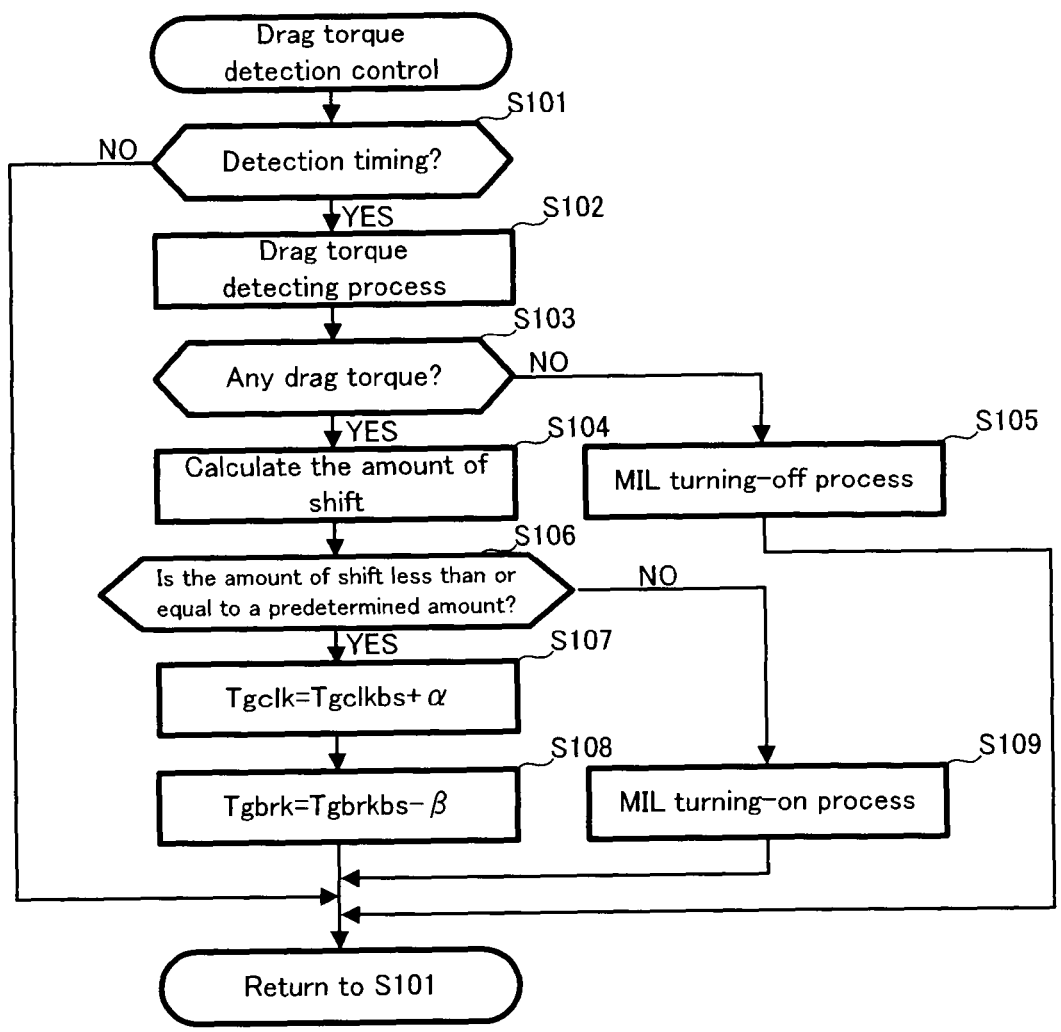
FIG. 5 is a flowchart showing drag torque detection control performed by an ECU in the hybrid vehicle in FIG. 1.

Now, with reference to FIG. 5, the details of the drag torque detection control will be explained. FIG. 5 is a flowchart showing the drag torque detection control.

In FIG. 5, the ECU 100 judges whether or not the detection timing of the drag torque has come (step S101). The detection timing of the drag torque is timing suitable for various drag torque detecting processes explained later and timing set to suppress the frequency of its execution such that the drag torque is not detected frequently enough to damage its significance.

If a present time point is not the detection timing of the drag torque (the step S101: NO), the ECU 100 repeatedly performs the step S101. On the other hand, if the detection timing of the drag torque has come (the step S101: YES), the ECU 100 performs the drag torque detecting process (step S102).

Now, the various drag torque detecting processes in the step S102 will be explained.

<First Detecting Method>

Figure 6:
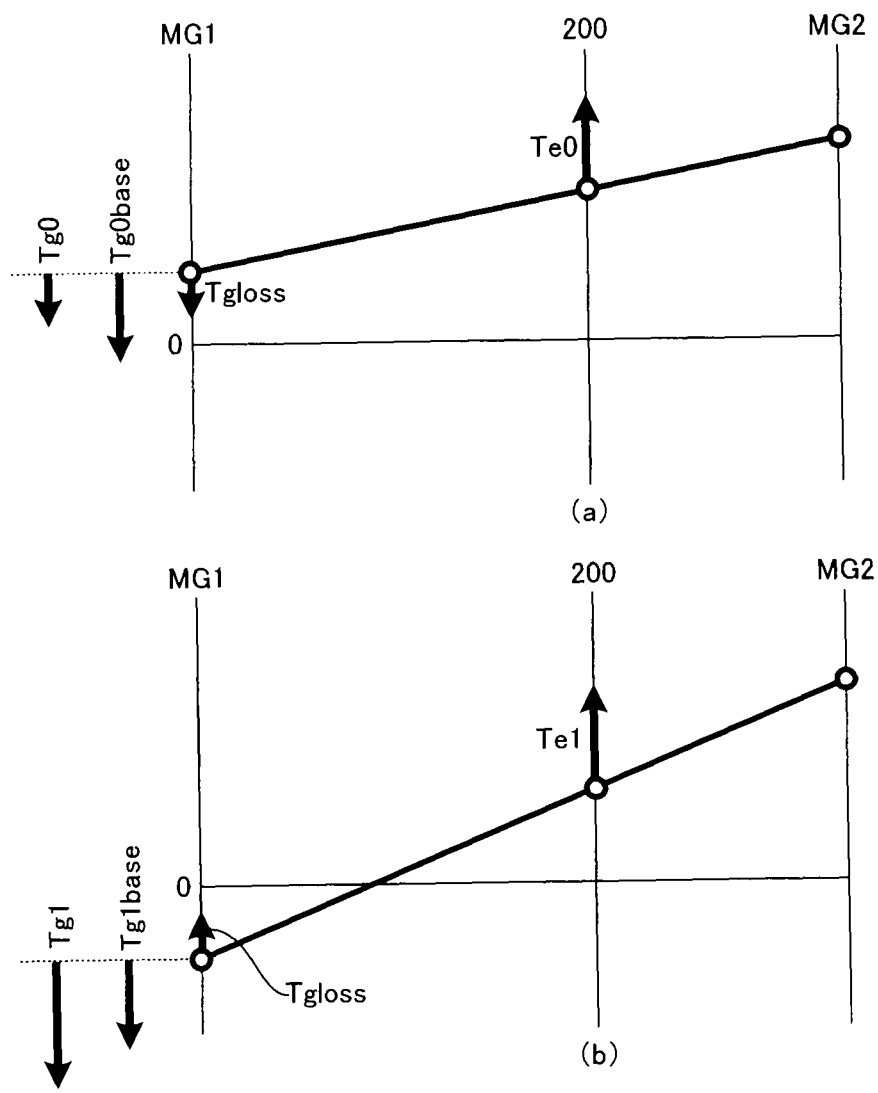
FIG. 6 are operational nomograms of the hybrid drive apparatus explaining a method of detecting the drag torque of a locking mechanism in the hybrid vehicle in FIG. 1.

Firstly, with reference to FIG. 6, an explanation will be given on a first detecting method associated with the drag torque detection. FIG. 6 are operational nomograms of the hybrid drive apparatus 10. Incidentally, in FIG. 6, portions overlapping those of FIG. 4 will carry the same reference numerals, and the explanation thereof will be omitted as occasion demands. Incidentally, in FIG. 6, FIG. 6(*a*) shows a case where the MG1 is in a positive rotation state, and FIG. 6(*b*) shows a case where the MG1 is in a negative rotation state.

Here, in the stepless speed change mode, if the engine 200 outputs the engine torque Te, the MG1 torque Tg as the torque to be supplied from the motor generator MG1 as the rotational speed control apparatus is the reaction torque which is a negative torque and which corresponds to the torque calculated by the aforementioned equation (1).

In FIG. 6(*a*), it is assumed that the engine torque Te is Te=Te0. In this case, it is assumed that the MG1 torque Tg in a normal state in which a drag torque Tgloss is not generated in the brake mechanism 400 is Tg0base illustrated.

On the other hand, the brake mechanism 400 is a mechanism for locking the motor generator MG1, and the drag torque Tgloss acting between the brake plates always acts in a direction of stopping the motor generator MG1. In other words, if the MG1 is in the positive rotation state as shown in FIG. 6(*a*), the direction of the action of the drag torque Tgloss matches the direction of the MG1 torque Tg as the reaction torque.

Therefore, in this case, the drag torque Tgloss functions as one portion of the reaction torque, and the following equation (3) holds true. In other words, the absolute value of an actual MG1 torque Tg0 to be supplied from the motor generator MG1 in order to bear the reaction torque of the engine torque Te0 is less than that of the aforementioned Tg0base by the amount of the drag torque Tgloss. Incidentally, since the reaction torque is a negative torque, in this case, the MG1 torque increases in terms of the magnitude correlation of the torque including positive and negative signs. As described above, if the drag torque Tgloss is generated in the brake mechanism 400 in the positive rotation state of the MG1, the MG1 torque Tg as the output torque of the motor generator MG1 is greater than that in a case where the drag torque Tgloss is not generated.

$$Tg0 = Tg0base - Tgloss \qquad (3)$$

The ECU 100 uses this relation and detects the generation of the drag torque Tgloss. In other words, the ECU 100 calculates a torque actually outputted by the motor generator MG1 (i.e. a torque corresponding to the aforementioned Tg0 and one example of the "first torque" of the present invention) from the actual drive condition of the motor generator MG1 (e.g. a drive current supplied via the PCU 11 and a duty ratio as its control amount) or the like. On the other hand, the original torque in the case where the drag torque Tgloss is not generated (i.e. the torque corresponding to the aforementioned Tg0base) can be calculated from the operating condition of the hybrid vehicle 1. In other words, apart from a transient operating condition, if the engine rotational speed Ne and an engine required output Pne corresponding to a required driving force determined on the basis of the accelerator opening degree Ta and the vehicle speed V detected by the accelerator opening sensor 13 and the vehicle speed sensor 14, respectively, are already known, then, the engine torque Te can be calculated by using them. If the engine torque Te is calculated, it is possible to obtain the value of the MG1 torque to be originally supplied from the MG1 (i.e. one example of the "second torque" of the present invention) by using the aforementioned equation (1) based on the gear ratio of the power dividing mechanism 300.

In the normal state in which the drag torque Tgloss is not generated, the MG1 torque Tg0 should be equal to the Tg0base. If the MG1 torque Tg0 (the first torque) is greater (less as the absolute value) than Tg0base (the second torque), it is possible to judge that the drag torque Tgloss is generated. Incidentally, the judgment is one example of the operations of the "judging device" of the present invention. At this time, the ECU 100 may also detect the generation of the drag torque Tgloss if their difference exceeds a threshold value set in view of errors and various matters in advance.

On the other hand, in FIG. 6(*b*), it is assumed that the engine torque Te is Te=Te1. In this case, it is assumed that the MG1 torque Tg in the normal state in which the drag torque Tgloss is not generated in the brake mechanism 400 is Tg1base illustrated.

Here, as described above, since the drag torque Tgloss always acts in the direction of stopping the motor generator MG1, if the MG1 is in the negative rotation state as shown in FIG. 6(*b*), the direction of the action of the drag torque Tgloss is opposite to the direction of the MG1 torque Tg as the reaction torque.

Therefore, in this case, the drag torque Tgloss acts in a direction of interrupting the action of the reaction torque, and the following equation (4) holds true. In other words, the absolute value of an actual MG1 torque Tg1 to be supplied from the motor generator MG1 in order to bear the reaction torque of the engine torque Te1 is greater than that of the aforementioned Tg1base by the amount of the drag torque Tgloss. Incidentally, since the reaction torque is a negative torque, in this case, the MG1 torque decreases in terms of the magnitude correlation of the torque including the positive and negative signs. As described above, if the drag torque Tgloss is generated in the brake mechanism 400 in the negative rotation state of the MG1, the MG1 torque Tg as the output torque of the motor generator MG1 is less than that in the case where the drag torque Tgloss is not generated.

$$Tg1 = Tg1base - Tgloss \quad (4)$$

In the normal state in which the drag torque Tgloss is not generated, the MG1 torque Tg0 should be equal to the Tg0base. In cases where the MG1 is in the negative rotation area, If the MG1 torque Tg0 (the first torque) is less (greater as the absolute value) than Tg1base (the second torque), it is possible to judge that the drag torque Tgloss is generated.

Here in particular, the variation in the MG1 torque Tg as described above is not necessarily caused only by the drag torque Tgloss, and it can be also caused by a shift in the output characteristics of the engine 200. In other words, in the case of FIG. 6(*a*), if an engine torque Te0' is outputted from the engine 200 although the engine torque Te is originally to be Te0, the MG1 torque Tg supplied from the motor generator MG1 also changes by that much.

However, an influence of the shift in the engine output characteristics on the reaction torque does not change depending on the rotation area of the motor generator MG1. If the engine torque Te is shifted to an increase side, the absolute value of the reaction torque increases, and if the engine torque Te is shifted to a reduction side, the absolute value of the reaction torque decreases. Therefore, by performing the aforementioned comparison process in the both cases where the motor generator MG1 is in the positive rotation state and in the negative rotation state, it is possible to classify the shift in the MG1 torque Tg into a shift due to the engine 200 side and a shift due to the drag torque Tgloss. In other words, it is possible to accurately detect the generation of the drag torque Tgloss.

<Second Detecting Method>

Figure 7:
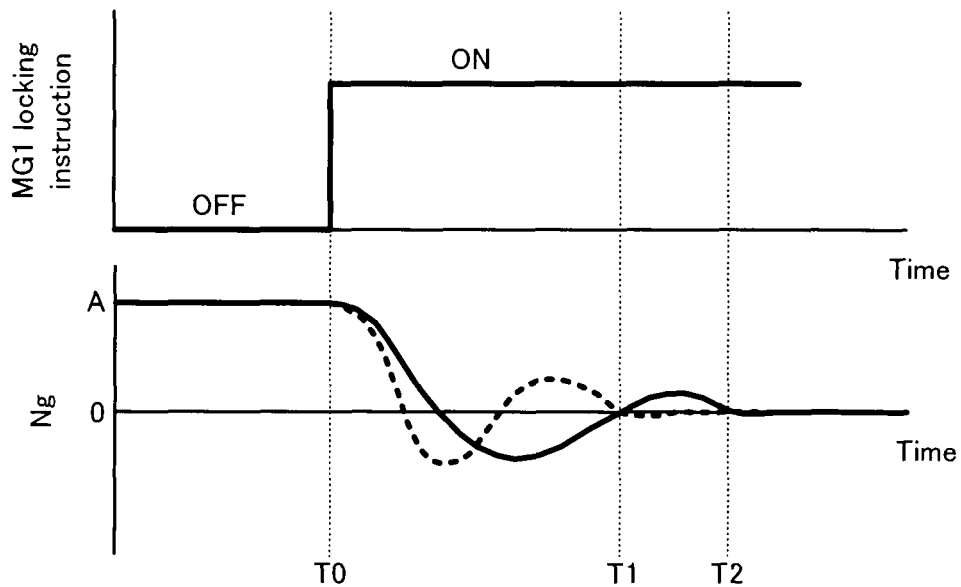
FIG. 7 is a view associated with another method of detecting the drag torque in the locking mechanism and showing the temporal transition of a MG1 rotational speed in performing MG1 lock.

Next, with reference to FIG. 7, a second method associated with the detection of the drag torque Tgloss will be explained. FIG. 7 is a schematic time characteristic diagram showing one temporal transition of the MG1 rotational speed Ng in the MG1 locking using the brake mechanism 400.

In FIG. 7, it is assumed that a MG1 locking instruction is issued (i.e. corresponding to a case where the vehicle speed V and a required driving force Ft correspond to a MG1 locking area set in advance) at a time point T0 and that the control of the rotational speed of the motor generator MG1 is started such that the motor generator MG1 makes the MG1 rotational speed Ng converge on zero rotation from a state in which the MG1 rotational speed Ng=A.

Here, if the drag torque Tgloss is not generated in the rock mechanism 400, as shown in the solid line, the MG1 rotational speed Ng converges on the zero rotation at a time point T2. On the other hand, if the drag torque Tgloss is generated in the brake mechanism 400, as described above, the drag torque Tgloss always acts in the direction of interrupting the rotation of the MG1. Thus, a speed of the convergence on the zero rotation is higher than that in the normal case, as shown in the dashed line. As a result, the MG1 converges on the zero rotation at a time point T1 which is earlier than in the normal case.

The ECU 100 measures the convergence speed of the MG1 rotational speed Ng in performing the MG1 locking (i.e. one example of the "detection timing" described above). At this time, by experimentally ascertaining the convergence characteristic of Ng in the normal case or by measuring the convergence speed of Ng every time the MG1 locking instruction is issued in the operation period of the hybrid vehicle 1, it is possible to judge that the drag torque Tgloss is issued if the MG1 rotational speed Ng converges on the zero rotation earlier than a convergence time in the normal case or if the MG1 rotational speed Ng converges on the zero rotation clearly earlier than another sample value.

<Third Detecting Method>

Figure 8:
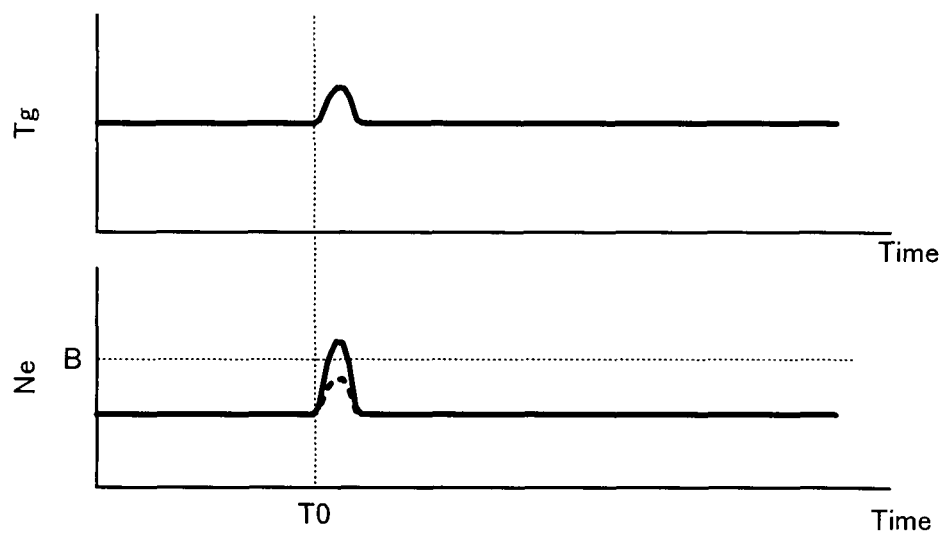
FIG. 8 is a view associated with another method of detecting the drag torque in the locking mechanism and showing the temporal transition of an engine rotational speed Ne in reducing a reaction torque.

Next, with reference to FIG. 8, a third method associated with the detection of the drag torque Tgloss will be explained. FIG. 8 is a time characteristic diagram showing one temporal transition of the reaction torque Tg and the engine rotational speed Ne in steady driving. Incidentally, in FIG. 8, portions overlapping those of FIG. 7 will carry the same reference numerals, and the explanation thereof will be omitted as occasion demands.

In FIG. 8, at the time point T0 in a period in which the steady driving (incidentally, the steady driving means a relatively stable driving state other than an operating condition with acceleration and deceleration or with an excessive load variation) is performed, the ECU 100 reduces the reaction torque. Incidentally, since the reaction torque is a negative torque, the wording "reduce" means to change the MG1 torque Tg upward in FIG. 8.

If the reaction torque is reduced, a balance is disrupted between the engine torque Te and the MG1 torque Tg as the reaction torque in the steady driving state. The absolute value of the engine torque Te exceeds that of the reaction torque, and the engine rotational speed Ne of the engine 200 increases. However, the amount of the increase in the engine rotational speed Ne at this time is different between the case where the drag torque Tgloss is generated in the brake mechanism 400 and the case where it is not generated.

In other words, although the drag torque Tgloss always acts in the direction of interrupting the rotation of the motor generator MG1, since the MG1 and the engine 200 are coupled via the power dividing mechanism 300, the influence of the drag torque Tgloss appears on the engine rotational speed Ne. In FIG. 8, the characteristic of the engine rotational speed Ne in the normal case where the drag torque Tgloss is not generated is shown in the solid line, and the characteristic of the engine rotational speed Ne in the case where the drag torque Tgloss is generated is shown in the dashed line. As described above, in the case where drag torque Tgloss is generated and in the case where it is not generated, a magnitude correlation between the engine rotational speed Ne in each case and a threshold value B is reversed. Thus, for example, if the threshold value B is appropriately experimentally determined in advance (although a comparison with the threshold value is not necessarily required), the drag torque Tgloss can be detected, accurately.

Here, FIG. 8 shows a behavior in the case where the motor generator MG1 is in the positive rotation state. If the MG1 is in the negative rotation state, the relation between the solid line and the dashed line is reversed. In other words, if the reaction torque is eliminated in the negative rotation area, the direction of the action of the drag torque Tgloss matches a direction of promoting an increase in the rotation of the engine 200. Thus, the engine rotational speed Ne significantly increases in comparison with the case where the drag torque Tgloss is not generated. However, in any case, there is no difference in that the change in the behavior of the engine rotational speed Ne varies between the case where the drag torque Tgloss is generated and the case where it is not generated, and it is possible to detect the drag torque Tgloss without consideration of the rotation direction of the MG1.

<Fourth Detecting Method>

Figure 9:
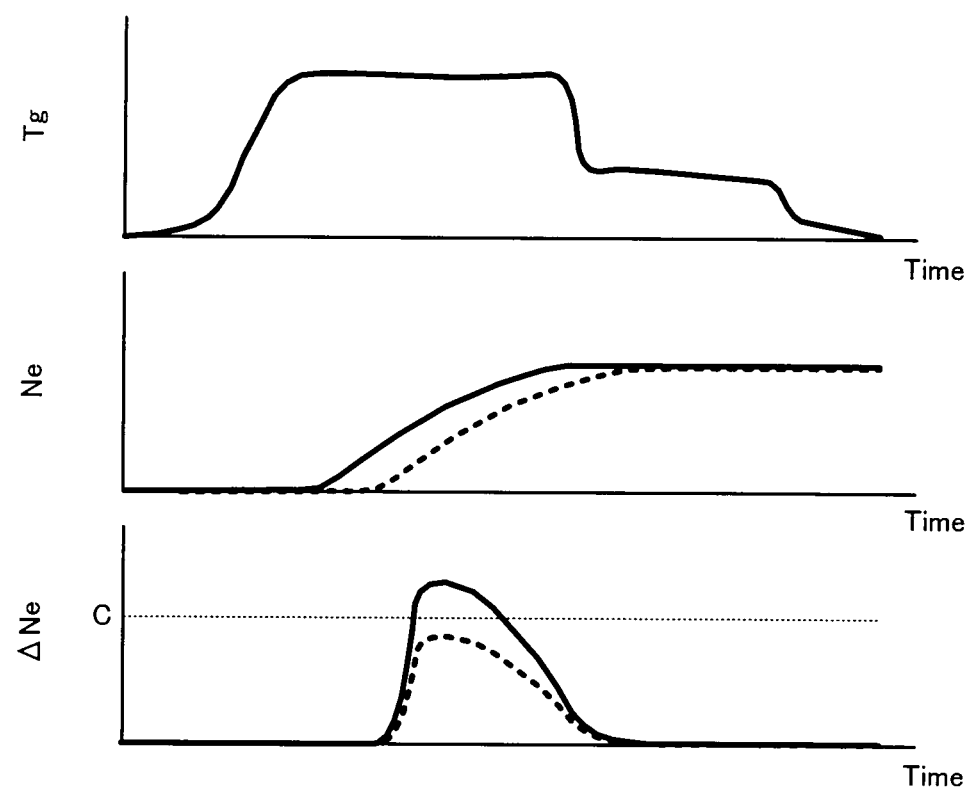
FIG. 9 is a view associated with another method of detecting the drag torque in the locking mechanism and showing the temporal transitions of the engine rotational speed Ne and its amount of change ΔNe in cranking.

Next, with reference to FIG. 9, a fourth method associated with the detection of the drag torque Tgloss will be explained. FIG. 9 is a time characteristic diagram showing one temporal transition of each of a cranking torque Tclk at the start of the engine, the engine rotational speed Ne, and an engine rotational speed change amount ΔNe. Incidentally, in FIG. 9, portions overlapping those of FIG. 8 will carry the same reference numerals, and the explanation thereof will be omitted as occasion demands.

In FIG. 9, the MG1 torque Tg is a cranking torque used for the cranking of the engine 200. The output characteristic of the MG1 torque when it is made to act as the cranking torque is experimentally determined in advance, which is shown in the solid line in FIG. 9.

If this type of cranking torque having the characteristic determined in advance is made to act on the engine 200, the increase characteristic of the engine rotational speed Ne varies depending on whether or not the drag torque Tgloss is generated in the brake mechanism 400. In other words, for example, it is assumed that the engine rotational speed Ne rises with the time characteristic shown in the solid line in FIG. 9 if the drag torque Tgloss is not generated. If the drag torque Tgloss is generated, the engine rotational speed Ne rises with the time characteristic shown in the dashed line in FIG. 9. As a result, the engine rotational speed change amount ΔNe has relations shown in the solid line and the dashed line in FIG. 9, and a magnitude correlation between the engine rotational speed change amount ΔNe in each case and a threshold value C is reversed from each other. Thus, for example, if the threshold value C is appropriately determined experimentally in advance (although a comparison with the threshold value is not necessarily required), the ECU 100 can accurately detect the drag torque Tgloss in starting the engine 200.

Here, FIG. 9 shows a behavior in the case where the motor generator MG1 is in the positive rotation state. In other words, it corresponds to the engine start from a state in which the hybrid vehicle is not moving (at a stop). On the other hand, if the hybrid vehicle 1 is in an EV driving state due to the motor torque Tm supplied form the motor generator MG2 or in similar cases, the engine 200 is in a state in which Ne=0 in view of the magnitude of its friction, and the MG1 is in the negative rotation state at the engine start.

In this case, the relation between the solid line and the dashed line is reversed. In other words, at the engine start, if the MG1 is in the negative rotation state, the direction of the action of the cranking torque matches that of the drag torque Tgloss acting in the direction of interrupting the rotation of the MG1. Thus, the increase in the MG1 rotational speed is promoted, and at the same time, the increase in the engine rotational speed Ne is also promoted. However, in any case, there is no difference in that the change in the behavior of the engine rotational speed Ne with respect to the cranking torque applied in the same characteristic varies between the case where the drag torque Tgloss is generated and the case where it is not generated, and it is possible to detect the drag torque Tgloss without consideration of the rotation direction of the MG1.

Back in FIG. 5, after the various drag torque detecting processes according to the various detecting methods described above, the ECU 100 judges whether or not the drag torque is generated (step S103). If the drag torque is not generated (the step S103: NO), the ECU 100 turns off a Multi Information Lamp (MIL) disposed in the vehicle interior of the hybrid vehicle 1 (step S105) and returns the process to the step S101.

On the other hand, if the drag torque is generated (the step S103: YES), the ECU 100 calculates the amount of a shift in various index values (e.g. the amount of the change in the engine rotational speed Ne, the convergence speed of the MG1 rotational speed Ng, or the like) from those in the normal case, wherein the index values are used to judge whether or not the drag torque is generated in the various detecting methods (step S104). The amount of the shift is calculated as one portion of the detecting process in performing the detecting process according to the various detecting methods described above.

If the amount of the shift is calculated, the ECU 100 judges whether or not the amount of the shift is less than or equal to a predetermined amount (step S106). The predetermined amount is an experimentally determined fit value. If the amount of the shift is greater than the predetermined value (the step S106; NO), the ECU 100 turns on the MIL (step S109) and returns the process of the step S101.

On the other hand, if the amount of the shift is less than or equal to the predetermined value (the step S106; YES), instead of turning on the MIL, the ECU 100 corrects the cranking torque Tgclk supplied from the motor generator MG1 in the cranking of the engine 200 by offsetting it to the increase side by a correction amount a set in advance with respect to a reference value Tgclkbs (step S107). The correction amount a associated with the correction of the cranking torque is set such that the engine rotational speed Ne passes through a resonance band intrinsic to the engine 200 (e.g. near 400 rpm) early enough not to cause the vibration of the vehicle in the course that the engine 200 starts.

Moreover, the ECU 100 corrects a reduction torque Tgbrk supplied from the motor generator MG1 to stop the engine 200 in stopping the engine 200 by offsetting it to a reduction side by correction amount β set in advance with respect to a reference value Tgbrkbs (step S108). The correction amount β associated with the correction of the cranking torque is set such that the engine rotational speed Ne passes through the resonance band intrinsic to the engine 200 (e.g. near 400 rpm) early enough not to cause the vibration of the vehicle in the course that the engine 200 stops. If the step S108 is performed, the process is returned to the step S101.

As described above, according to the drag torque detection control in the embodiment, it is possible to detect the drag torque generated in the brake mechanism 400 in the early stages by the various detecting processes according to the various detecting methods described above. Therefore, it is possible to take various measures, such as announcing to the driver the functional fault of the brake mechanism 400 or suppressing the occurrence of the vibration by the resonance by correcting the cranking torque or the cutting torque, and it is possible to ensure the reliability of the hybrid vehicle 1. Moreover, the various detecting processes according to the various detecting methods described above are performed flexibly under various conditions including in the steady driving, in the MG1 locking, in the cranking, or the like. Thus, the detection frequency of the drag torque is sufficiently ensured. Therefore, it is useful in practice.

Second Embodiment

Figure 10:
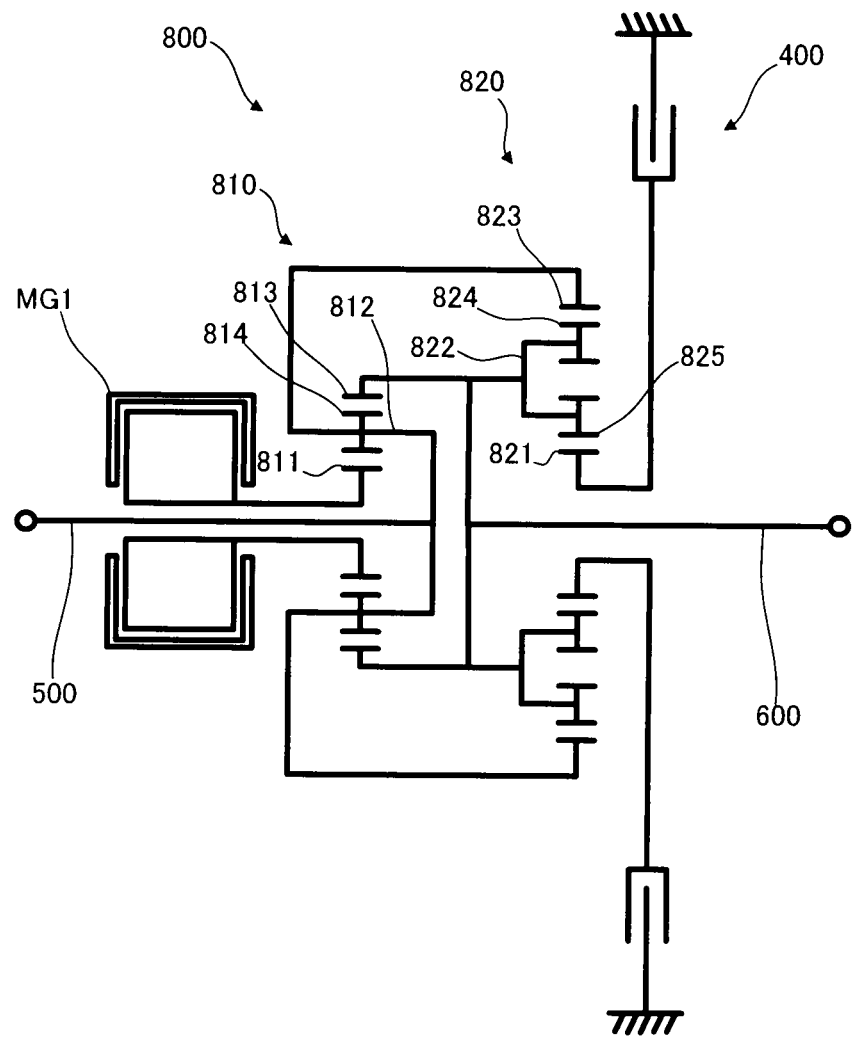
FIG. 10 is a schematic configuration diagram conceptually showing the structure of a hybrid drive apparatus in a second embodiment of the present invention.

In the aforementioned first embodiment, the MG1 is locked when the hybrid drive apparatus 10 adopts the fixed speed change mode. However, the configuration of the hybrid drive apparatus in obtaining the fixed speed change mode is not limited to this type of MG1 locking. Now, with reference to FIG. 10, the configuration of another hybrid drive apparatus will be explained. FIG. 10 is a schematic configuration diagram conceptually showing the structure of a hybrid drive apparatus 20. Incidentally, in FIG. 10, portions overlapping those of FIG. 2 will carry the same reference numerals, and the explanation thereof will be omitted as occasion demands.

In FIG. 10, the hybrid drive apparatus 20 has a different structure from that of the hybrid drive apparatus 10 in that it is provided with a power dividing mechanism 800 as another example of the "power transmission mechanism" of the present invention, instead of the power dividing mechanism 300. The power dividing mechanism 800 adopts a form of a so-called Ravigneaux-type planetary gear mechanism, provided with a first planetary gear mechanism 810 of a single pinion gear type and a second planetary gear mechanism 820 of a double pinion type, as a differential mechanism made of a plurality of rotational elements.

The first planetary gear mechanism 810 is provided with: a sun gear 811; a carrier 812; a ring gear 813; and a pinion gear 814 meshing with the sun gear 811 and the ring gear 813, which is held by the carrier 812 so as to rotate on its axis in the axial direction and to revolve due to the rotation of the carrier 812. The rotor of the motor generator MG1 is coupled with the sun gear 811, the input shaft 500 is coupled with the carrier 812, and the drive shaft 600 is coupled with the ring gear 813.

The second planetary gear mechanism 820 is provided with: a sun gear 821; a carrier 822; a ring gear 823; and a pinion gear 824 meshing with the ring gear 823 and a pinion gear 825 meshing with the sun gear 821, each of which is held by the carrier 822 so as to rotate on its axis in the axial direction and to revolve due to the rotation of the carrier 822. One brake plate of the brake mechanism 400 is coupled with the sun gear 821. In other words, in the embodiment, the sun gear 821 functions as another example of the "first rotational element" of the present invention.

As described above, the power dividing mechanism 800 is provided with four rotational elements in total, which are on the whole a first rotational element group composed of the sun gear 811 of the first planetary gear mechanism 810, the sun gear 821 (first rotational element) of the second planetary gear mechanism 820, the carrier 812 of the first planetary gear mechanism 810 and the ring gear 823 of the second planetary mechanism 820 which are coupled with each other, and a second rotational element group composed of the ring gear 813 of the first planetary gear mechanism 810 and the carrier 822 of the second planetary gear mechanism 820 which are coupled with each other.

According to the hybrid drive apparatus 20, if the sun gear 821 becomes in the lock state and its rotational speed becomes zero, then, the second rotational element group having a rotational speed uniquely meaning the vehicle speed V and the sun gear 821 define the rotational speed of the first rotational element group as the remaining one rotational element. The carrier 812 which constitutes the first rotational element group is coupled with the input shaft 500 coupled with the crankshaft 205 of the engine 200 (not illustrated). Thus, in the end, the engine rotational speed NE of the engine 200 has a unique relation with the vehicle speed V, and the fixed speed change mode is realized. As described above, the fixed speed change mode can be realized in the configuration other than the hybrid drive apparatus 10. In accordance with that, the lock target of the brake mechanism 400 may be changed as occasion demands. In any case, as long as it is provided with the brake mechanism 400 in which the drag torque can be generated, the various methods for detecting the drag torque of the present invention exemplified in the first embodiment are effective.

Third Embodiment

Next, a third embodiment of the present invention will be explained.

Configuration of Embodiment

Figure 11:
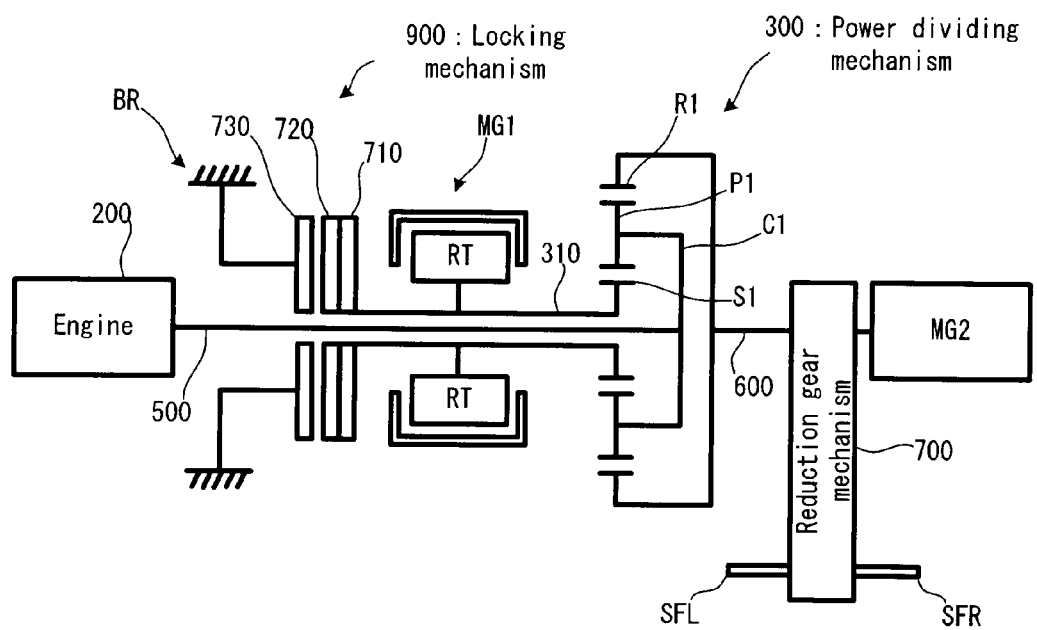
FIG. 11 is a schematic configuration diagram conceptually showing the structure of a hybrid drive apparatus in a hybrid vehicle in a third embodiment of the present invention.

Firstly, with reference to FIG. 11, an explanation will be given on the structure of a hybrid drive apparatus 30 in the third embodiment of the present invention. FIG. 11 is a schematic configuration diagram conceptually showing the structure of the hybrid drive apparatus 30. Incidentally, in FIG. 11, portions overlapping those of FIG. 2 will carry the same reference numerals, and the explanation thereof will be omitted as occasion demands.

Incidentally, the configuration of the vehicle in the third embodiment is the same as that of the hybrid vehicle 1, except that it is provided with the hybrid drive apparatus 30. Moreover, in the third embodiment, the ECU 100 can perform speed change control described later in accordance with a control program stored in the ROM. The ECU 100 is configured to function as one example of each of the "third controlling device", the "calculating device", the "correcting device", and the "selecting device" of the present invention.

In FIG. 11, the hybrid drive apparatus 30 is provided with: the engine 200, the power dividing mechanism 300, the MG1, the MG2, the input shaft 500, the drive shaft 600, the reduction gear mechanism 700, and a locking mechanism 900.

The locking mechanism 900 includes a cam 910, a clutch plate 920, and an actuator 930 as its main components. The locking mechanism 900 can selectively change the state of the sun gear S1 between the lock state in which the sun gear S1 cannot rotate and the release state in which the sun gear S1 can rotate. The locking mechanism 900 is a cam-lock type engaging apparatus as one example of the "locking mechanism" of the present invention. In other words, the sun gear S1 is one example of the "first rotational element" of the present invention.

Figure 12:
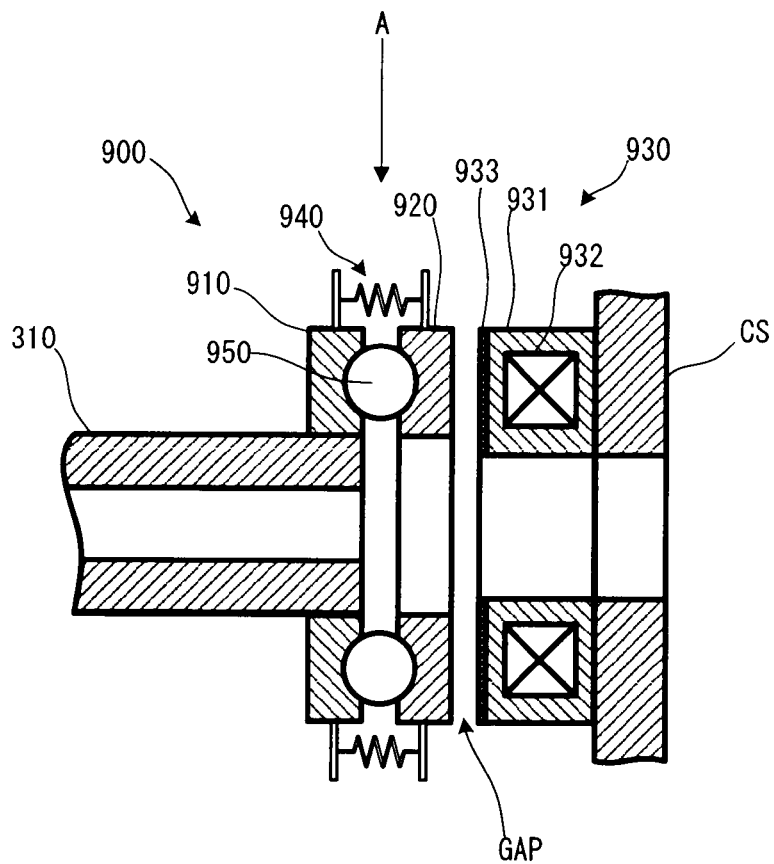
FIG. 12 is a schematic diagram showing one cross-sectional structure of the locking mechanism provided for the hybrid drive apparatus in FIG. 11.

Now, with reference to FIG. 12, the detailed structure of the locking mechanism 900 will be explained. FIG. 12 is a schematic cross sectional view showing one cross-sectional structure of the locking mechanism 900. Incidentally, in FIG. 12, portions overlapping those of FIG. 11 will carry the same reference numerals, and the explanation thereof will be omitted as occasion demands.

In FIG. 12, the locking mechanism 900 is provided with the cam 910, the clutch plate 920, the actuator 930, a return spring 940 and a cam ball 950.

The cam 910 is a substantially disk-shaped engaging member, which is coupled with the sun gear shaft 310, which can rotate integrally with the sun gear shaft 310 and the sun gear S1, and which makes a pair with the clutch plate 920. Incidentally, the cam 910 is not necessarily directly coupled with the sun gear shaft 310, and it may be indirectly coupled with the sun gear shaft 310 via various coupling members.

The clutch plate 920 is a disk-shaped engaging member, which is made of a magnetic metal material, which is placed opposite to the cam 910, and which makes a pair with the cam 910.

The actuator 930 is a drive apparatus including a suction part 931, an electromagnet 932 and a friction part 933.

The suction part 931 is the housing or package of the actuator 930 which is made of a magnetic metal member and which can accommodate the electromagnet 932. The suction part 931 is fixed to a case CS as a fixed element which is substantially integrally fixed with the outer member of the hybrid drive apparatus 30.

The electromagnet 932 is a magnet capable of generating a magnetic force in an excitation state in which a predetermined clutch engagement current Id (so-called excitation current) is supplied from a not-illustrated drive part receiving electric power supply from the battery 12. The magnetic force generated from the electromagnet 932 in the excitation state draws the aforementioned clutch plate 920 via the suction part 931 made of the magnetic metal material (i.e. applies an electromagnetic force as a driving force to the clutch plate 920 in a direction of drawing the clutch plate 920 to the electromagnet side). Incidentally, this drive part is electrically connected to the ECU 100, and the excitation operation of the electromagnet 932 is superior controlled by the ECU 100.

The friction part 933 is a friction functional body formed on the opposed surface of the clutch plate 920 in the suction part 931. The frictional coefficient of the friction part 933 is set to block the displacement of an object in a contact state more greatly than when the friction part 933 is not formed.

The return spring 940 is an elastic body which is fixed to the clutch 920 at one fixed edge. The other fixed edge is rotatably fixed to the housing or package (not illustrated) of the locking mechanism 900 via a bearing member such as a bearing. The return spring 940 biases or applies an electric force to the clutch plate 920 in the direction of the cam 910. Thus, the clutch plate 920 is normally stopped at a non-contact position across a predetermined opposed interval GAP from the suction part 931 in response to the biasing of the return spring 940.

The cam ball 950 is a spherical power transmission member laid between the cam 910 and the clutch plate 920. In the locking mechanism 900, a torque Tmg1 of the motor generator MG1 transmitted to the cam 910 via the sun gear S1 and the sun gear shaft 310 is transmitted to the clutch plate 920, with the cam ball 950 as a transmission element.

Figure 13:
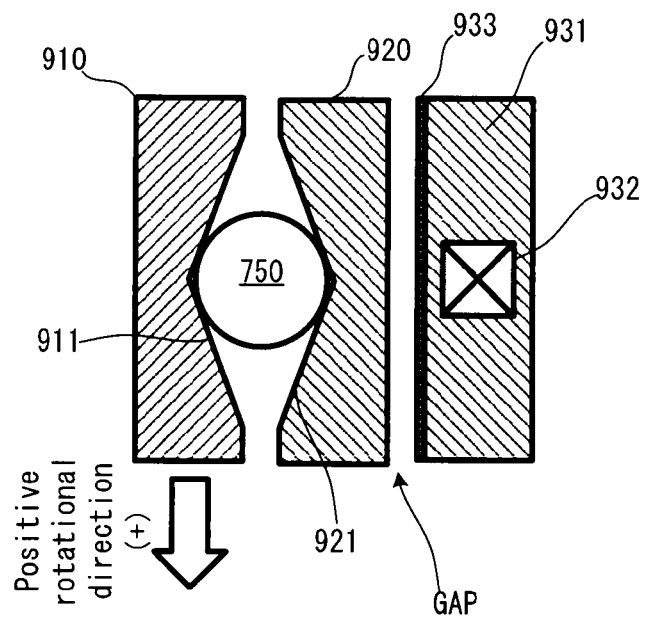
FIG. 13 is a schematic diagram showing one cross-sectional structure of the locking mechanism viewed in an arrow A direction in FIG. 12.

Now, with reference to FIG. 13, the structure of the locking mechanism 900 will be explained, more specifically. FIG. 13 is a schematic cross sectional view showing the locking mechanism 900 viewed in an arrow A direction in FIG. 12. Incidentally, in FIG. 13, portions overlapping those of FIG. 12 will carry the same reference numerals, and the explanation thereof will be omitted as occasion demands.

In FIG. 13, the opposed surface of each of the cam 910 and the clutch plate 920 is formed such that the thickness of the opposed surface in the extending direction of the sun gear shaft 310 becomes smaller as it goes toward its central portion. The cam ball 950 is held near the central portion in which the cam 910 and the clutch plate 920 have the largest opposed space. Thus, if the clutch plate 920 is at the aforementioned non-contact position, the cam 910 and the clutch plate 920 rotate substantially integrally in a direction equal to the rotational direction of the motor generator MG1, with the cam ball 950 as a torque transmission element. Therefore, if the clutch plate 920 is at the aforementioned non-contact position, the rotation of the motor generator MG1 is not blocked at all, at least in practice. Incidentally, in FIG. 13, a downward direction is defined as the positive rotational direction of the motor generator MG1. The motor generator MG1 can rotate not only in the positive rotational direction but also in a negative rotational direction (whose illustration is omitted) precisely opposite to the positive rotational direction.

Incidentally, in the embodiment, the MG2 and the ring gear R1 are coupled with the same rotational element of the reduction gear mechanism 700, and the MG2 rotational speed Nm is equivalent to the rotational speed of the ring gear R1. However, the MG2 and the ring gear R1 may be coupled with mutually different rotational elements. In this case, the rotational speed of the ring gear R1 and the MG2 rotational speed Nm may be different by an amount corresponding to a predetermined gear ratio. Alternatively, between the MG2 and the reduction gear mechanism 700, there may be a stepped transmission provided with a plurality of gear steps or gear stages having mutually different gear ratios.

Operations in Embodiment

<Locking Action of Locking Mechanism 900>

Figure 14:
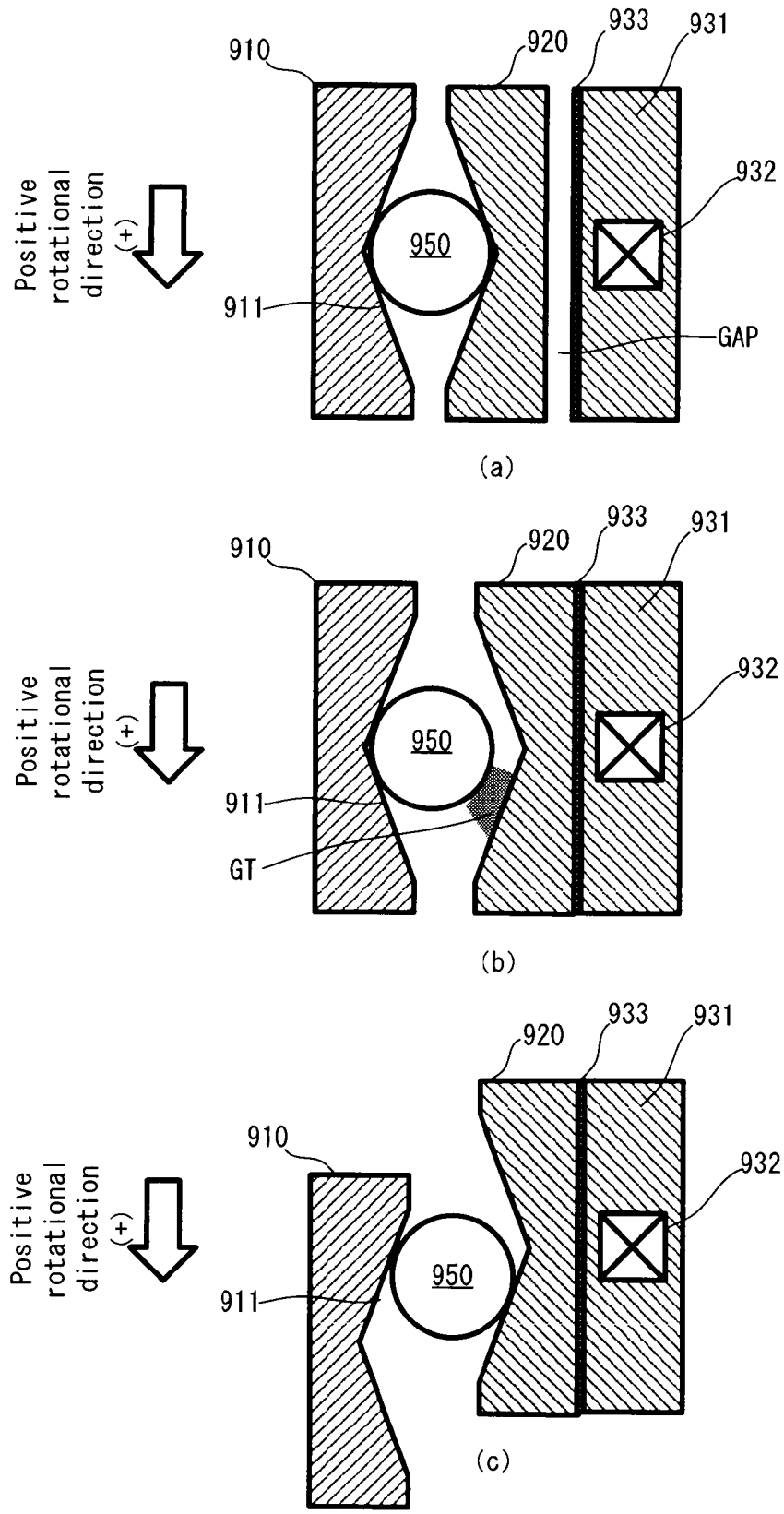
FIG. 14 are schematic cross sectional views explaining a process in which a sun gear transits from a release state to a lock state due to the locking action of a brake mechanism in FIG. 12.

In the hybrid drive apparatus 10, the locking mechanism 900 can selectively change the state of the sun gear S1 between the lock state and the release state, with the sun gear S1 as the first rotational element of the present invention. Incidentally, the sun gear S1 is coupled with the motor generator MG1 as described already, and if the sun gear S1 is in the lock state, the MG1 is also in the lock state in which the MG1 cannot rotate. Therefore, hereinafter, a situation in which the sun gear S1 is in the lock state is expressed as that "the MG1 is in the lock state" or the like, as occasion demands. Now, with reference to FIG. 14, an explanation will be given on the locking action of the sun gear S1 by the locking mechanism 900. FIG. 14 are schematic cross sectional views explaining a locking transition process in which the sun gear 51 transfers from the release state to the lock state due to the locking action of the locking mechanism 900. Incidentally, in FIG. 14, portions overlapping those of FIG. 12 or FIG. 13 will carry the same reference numerals, and the explanation thereof will be omitted as occasion demands.

In FIG. 14, FIG. 14(*a*) shows the same state as in FIG. 13, in which there is the opposed space GAP between the clutch plate 920 and the friction part 933 and in which the clutch plate 920 can rotate without an influence of a deterrent power by the friction part 933. Thus, by the action of the cam ball 950, the cam 910 and the clutch plate 920 can rotation substantially integrally. Here, the cam 910 is coupled with a rotor RT of the MG1 via the sun gear shaft 310, and the rotor RT is coupled with the sun gear S1 via the sun gear shaft 310. Therefore, in the hybrid drive apparatus 30, the cam 910 can be treated as a rotational element that rotates integrally with the sun gear S1. In other words, in the state shown in FIG. 14(*a*), the sun gear S1 can also rotate without restriction of the clutch plate 920. This state corresponds to one example of the "non-lock state" of the present invention.

FIG. 14(*b*) shows a state in which the clutch engagement current Id is supplied to the electromagnet 932 of the actuator 930. In other words, in this case, an electromagnetic force generated from the electromagnet 932 acts on the clutch plate 920 via the suction part 931, and the clutch plate 920 overpowers the biasing of the return spring 940, is displaced to a contact position antithetical to the non-contact position, and is adsorbed to the suction part 931. As a result, the opposed space GAP disappears. Moreover, simultaneously with the supply of the electromagnetic force by the excitation, the friction part 933 exerts a friction force on the clutch plate 920, and this hinders the operations of the clutch plate 920 in the positive rotational direction or negative rotational direction. In other words, in this state, the operations of the clutch plate 920 are hindered by the electromagnet 932 and the friction part 933, and the clutch plate 920 comes to rest with respect to the actuator 930, i.e. the case CS.

On the other hand, in the state that the clutch plate 920 is absorbed to the suction part 931 as described above, instead of the opposed space GAP that disappears, a play or backlash GT along the rotational direction is formed between the cam ball 950 and the clutch plate 920. Therefore, if the cam 910 is influenced by the rotation of the MG1 and rotates in the positive rotational direction or negative rotational direction, only the cam 910 and the cam ball 950 are displaced in the rotational direction. Incidentally, here, the explanation will be continued under the assumption that they are displaced in the positive rotational direction. Here, the newly formed play GT is reverse-tapered as viewed in the cross section, as described above. As the cam ball 950 moves in the rotational direction, the newly formed play GT is gradually reduced. Eventually, it disappears and comes into a play elimination completion state. In the play elimination completion state, the cam 910, the cam ball 950 and the clutch plate 920 come into contact with each other again.

FIG. 14(*c*) shows the play elimination completion state described above. If the cam 910 rotates in the positive rotational direction in this play elimination completion state, a pressing force which further presses the clutch plate 920 in the direction of the actuator 930 is generated on the cam ball 950 by the action of the reverse-tapered opposed surface. As a result, the cam 910 becomes in the lock state due to the pressing force and the friction force given from the friction part 933. In this lock state, the cam 910 also comes to rest, i.e. becomes in a fixed state, with respect to the case CS as in the clutch plate 920. As a result, the sun gear S1 which rotates integrally with the cam 910 also gets fixed to the case CS. In the lock state, the rotational speed of the sun gear 51, i.e. the MG1 rotational speed Ng, is zero. The lock state is canceled or released if the supply of the excitation current to the electromagnet 932 is stopped because the clutch plate 920 is returned to the original non-contact position by the action of the return spring 940.

<Details of Speed Change Mode>

Now, with reference to FIG. 15, the details of the speed change control will be explained. FIG. 8 is a flowchart showing the speed change control.

Figure 15:
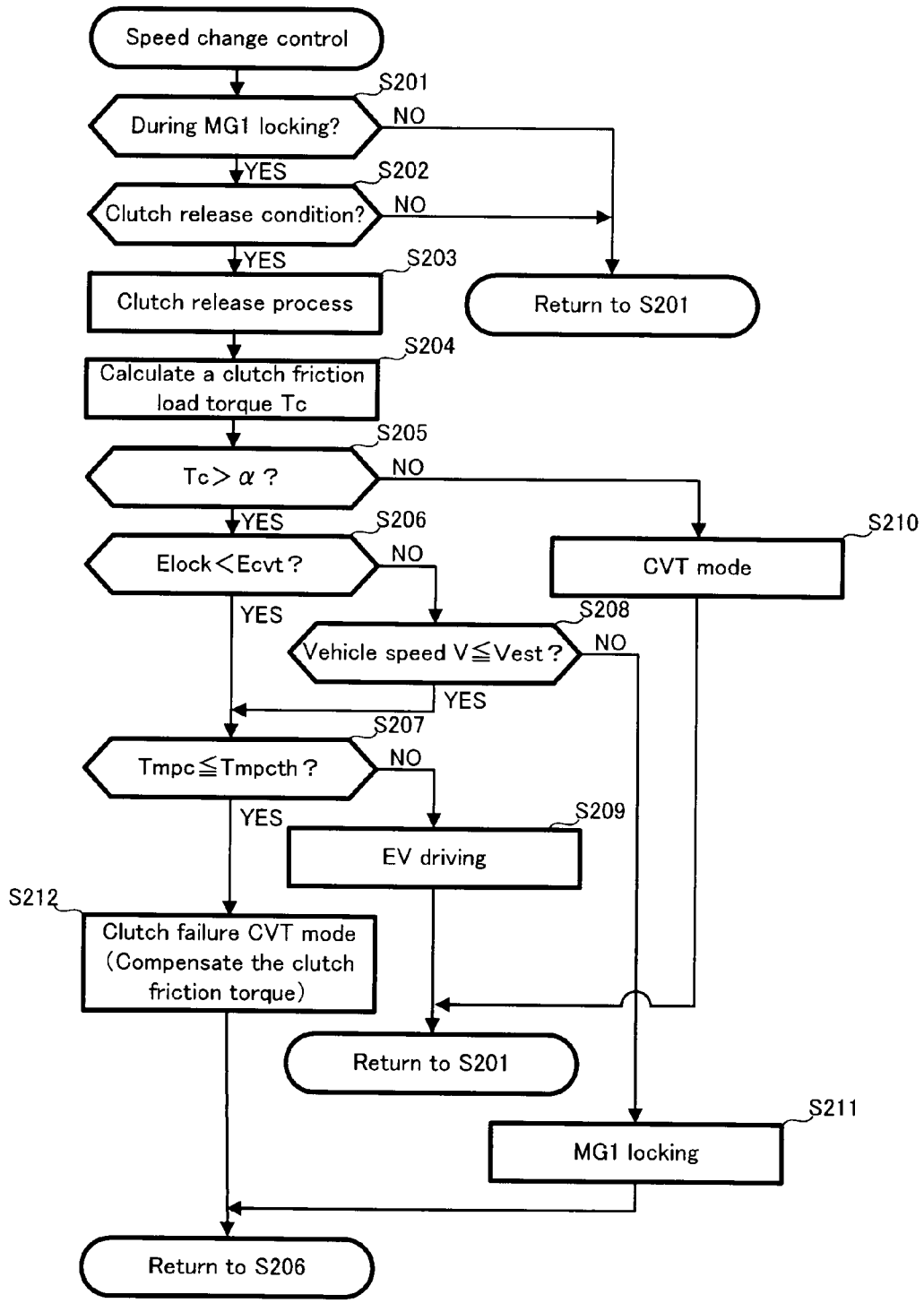
FIG. 15 is a flowchart showing speed change control performed by the ECU in the hybrid vehicle in FIG. 1.

In FIG. 15, the ECU 100 judges whether or not the MG1 is in the lock state (step S201). If the MG1 is not in the lock state (the step S201: NO), i.e. if the stepless speed change mode is selected, the ECU 100 repeatedly performs the step S201.

On the other hand, if the MG1 is in the lock state (the step S201: YES), the ECU 100 judges whether or not a clutch release condition is satisfied, wherein the clutch release condition indicates that the lock of the MG1 by the locking mechanism 900 described above is to be ended (step S202). In other words, the ECU 100 judges whether or not it is the change timing of the speed change mode from the fixed speed change mode to the stepless speed change mode. If the clutch release condition is not satisfied (the step S202: NO), the ECU 100 returns the process to the step S201 and repeats a series of the process operations.

If the clutch release condition is satisfied (the step S202: YES), the ECU 100 performs a clutch release process (step S203). The clutch release process means namely to stop the supply of the drive current Id to the electromagnet 932 in the actuator 930, as described above. If the supply of the drive current Id is stopped, the clutch plate 920 is released from the suction part 931 and the friction part 933. The clutch plate 920 is returned to the non-contact position by the action of the return spring 940, and the MG1 is returned to the non-lock state in which the MG1 can rotate.

If the clutch release process is performed, the speed change mode is changed to the stepless speed change mode. If the speed change mode is changed to the stepless speed change mode, the ECU 100 calculates a clutch friction load torque Tc (step S204). Incidentally, the clutch friction load torque Tc is one example of the "drag torque" of the present invention, and it is a type of braking torque supplied from the friction part 933 due to the fact the clutch plate 920 is not completely released from the friction part 933 for some reasons.

Figure 16:
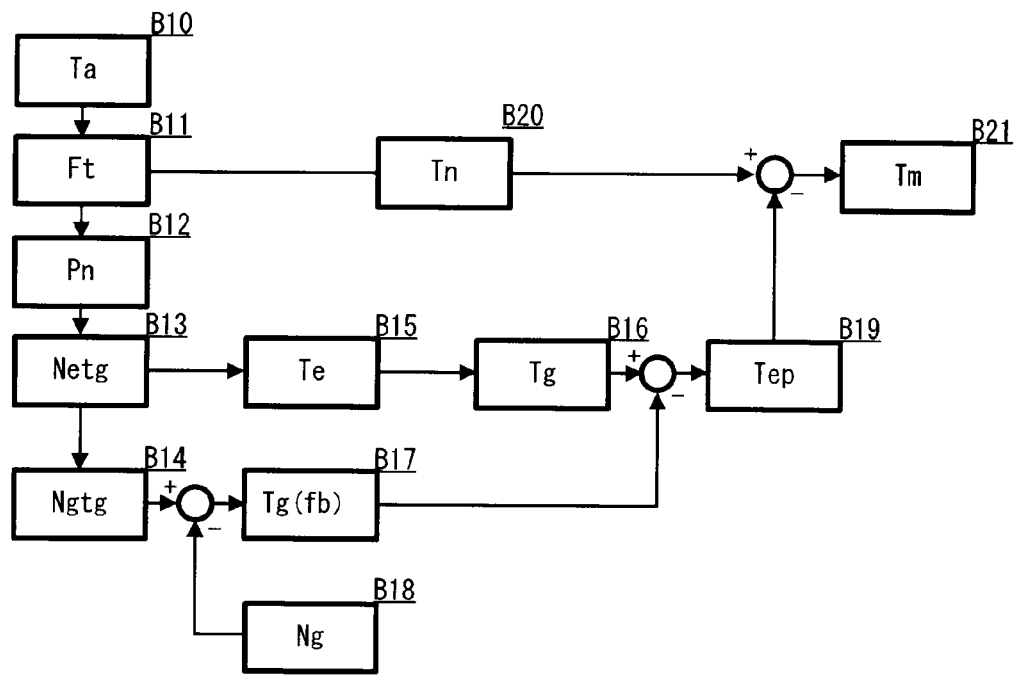
FIG. 16 is a basic control block diagram of a stepless speed change mode.

Before a method of calculating the clutch friction load torque Tc is explained, the control flow of the stepless speed change mode will be explained with reference to FIG. 16. FIG. 16 is a control block diagram of the stepless speed change mode.

In FIG. 16, the stepless speed change mode consists of control blocks B10 to B21.

Firstly, the ECU 100 obtains the accelerator opening degree Ta (control block B10) and determines the required driving force Ft of the hybrid vehicle 1 from a required driving force map with reference to the accelerator opening degree Ta and the vehicle speed V (control block B11). If the required driving force Ft is determined, the engine required output Pn is further calculated (control block B12).

If the engine required output Pn is calculated, a target engine rotational speed Netg as the target rotational speed of the engine 200 is determined on the basis of the engine required output Pn (control block B13), and the engine torque Te is uniquely or primarily determined in accordance with an optimal fuel economy operating line defined in an operating point map in advance (control block B15). If the engine torque Te is determined, the MG1 torque Tg is calculated in accordance with the aforementioned equation (1) defined on the basis of the gear ratio between the rotational elements of the power dividing mechanism 300 (control block B16).

On the other hand, from the target engine rotational speed Netg, a target MG1 rotational speed Ngtg as the target value of the MG1 rotational speed Ng is determined (control block B14). The target MG1 rotational speed Ngtg is uniquely or primarily defined from the target engine rotational speed Netg and the rotational speed of the drive shaft 600 which has a unique relation with the vehicle speed V. If the target MG1 rotational speed Ngtg is determined, the MG1 rotational speed Ng at the present time point detected by a detecting device such as a resolver is obtained (control block B18).

The ECU 100 calculates a deviation between the target MG1 rotational speed Ngtg and the MG1 rotational speed Ng and calculates a MG1 torque feedback value Tg(fb) as the feedback control amount of the MG1 torque on the basis of the deviation (control block B16). With regard to the calculated MG1 torque feedback value Tg(fb), a deviation between the MG1 torque Tg calculated in the control block B16 and the MG1 torque feedback value Tg(fb) is calculated, and the deviation is calculated as a direct torque Tep (control block B19).

On the other hand, the ECU 100 calculates a drive shaft required torque Tn as the required torque of the drive shaft from the required driving force Ft (control block B20) and calculates a deviation between the drive shaft required torque Tn and the direct torque Tep. The calculated deviation is treated as the MG2 torque Tm to be supplied from the motor generator MG2.

Here, the MG1 torque feedback value Tg(fb) calculated in the control block B17 mainly means the inertia torque of the engine 200 and the MG1 generated when the MG1 rotational speed Ng is increased from the zero rotation to the target MG1 rotational speed Ngtg. However, if the clutch friction load torque Tc acts on the MG1 from the locking mechanism 700, this clutch friction load torque Tc is also included in the MG1 torque feedback value Tg(fb). Thus, as a difference between the MG1 torque feedback value Tg(fb) and the inertia torque, the clutch friction load toque Tc can be detected.

Back in FIG. 8, more specifically, the ECU 100 calculates the clutch friction load torque Tc in accordance with the following equations (3) to (5). Incidentally, in each equation, Te is the engine torque, Tg is the MG1 torque, Tg(fb) is the torque feedback value, Ig is the inertia moment of the MG1, Ie is the inertia moment of the engine 200, $\rho$ is the gear ratio between the sun gear S1 and the ring gear R1, and $\omega$ is the angular velocity of the MG1.

$$Tdb = \rho/(1+\rho) \times Te - (Tg - Tg(fb)) - (Ig + ((\rho/(1+\rho))^2 \times Ie) \times d\omega/dt \quad (3)$$

$$Tda = \rho/(1+\rho) \times Te - (Tg - Tg(fb)) - (Ig + ((\rho/(1+\rho))^2 \times Ie) \times d\omega/dt \quad (4)$$

$$Tc = Tda - Tdb \quad (5)$$

Here, with regard to Tdb and Tda, their calculation formulas are identical, but their calculation timing is different. In other words, Tdb is the loss torque of the hybrid drive apparatus 10 before the clutch engagement, and the Tda is the loss torque of the hybrid drive apparatus 30 after the clutch release. Incidentally, before the clutch engagement and after the clutch release mean the same state; the clutch engagement merely takes place between them. In other words, the equations (3) to (5) are arithmetic processing for always understanding or knowing how the loss torque changes every time the clutch engagement takes place. Therefore, the ECU 100 stores the loss torques of a plurality of samples in the RAM or the like all the time and executes the equation (5) with the latest loss torque as Tda and the loss torque calculated one timing before as Tdb.

If the clutch friction load torque Tc is calculated, the ECU 100 judges whether or not the calculated clutch friction load torque Tc is greater than a threshold value a (step S205). If the clutch friction load torque Tc is less than or equal to the threshold value a (the step S205: NO), the ECU 100 takes it as the drag torque within a range in which there is no problem in practice, performs a normal CVT mode (stepless speed change mode) (step S210), and returns the process to the step S201.

On the other hand, if the clutch friction load torque Tc is greater than the threshold value a (the step S205: YES), the ECU 100 judges that the locking mechanism 900 has an engagement failure (i.e. one example of the "failure state" of the present invention) and moves the process to a process in the engagement failure.

As the process in the engagement failure, firstly, the system efficiency $\eta$sys of the hybrid drive apparatus 10 is compared between the fixed speed change mode and the CVT mode, and it is judged whether or not a system efficiency Elock in the fixed speed change mode is less than a system efficiency Ecvt in the stepless speed change mode (step S206). If the system efficiency Elock is greater than or equal to the system efficiency Ecvt (the step S206: NO), i.e. if it is possible to drive the hybrid vehicle 1 at a higher efficiency when the fixed speed change mode is selected, then, it is further judged whether or not the vehicle speed V is less than or equal to an engine stall limit speed Vest in a case where the fixed speed change mode is selected (step S208).

If the vehicle speed V in the case where the fixed speed change mode is selected is greater than the engine stall limit speed Vest (the step S208: NO), the ECU 100 controls the locking mechanism 900 to lock the MG1 and changes the speed change mode to the fixed speed change mode (step S211). On the other hand, if the vehicle speed V in the case where the fixed speed change mode is selected is less than or equal to the engine stall limit speed Vest (the step S208: YES), or if the system efficiency Ecvt is greater than the system efficiency Elock (the step S206: YES), the ECU 100 judges whether or not a clutch part temperature Tmpc as the temperature of the locking mechanism 900 is less than or equal to an upper limit value Tmpcth (step S207). Incidentally, the clutch part temperature Tmpc is the temperature of the clutch plate 920, and it is detected as occasion demands by a temperature sensor which is not illustrated but is placed in a proper installation site of the hybrid drive apparatus 30. Moreover, this temperature sensor is electrically connected to the ECU 100, and the detected clutch part temperature Tmpc is referred to by the ECU 100 with a constant or irregular period.

If the clutch part temperature Tmpc is greater than the upper limit value Tmpcth (the step S207: NO), the ECU 100 controls the hybrid drive apparatus 30 to be in an EV mode and performs the EV-driving of the hybrid vehicle 1. In other words, the engine 200 and the motor generator MG1 stop the operation thereof. If the driving in the EV mode is started, the process is returned to the step S201.

Figure 17:
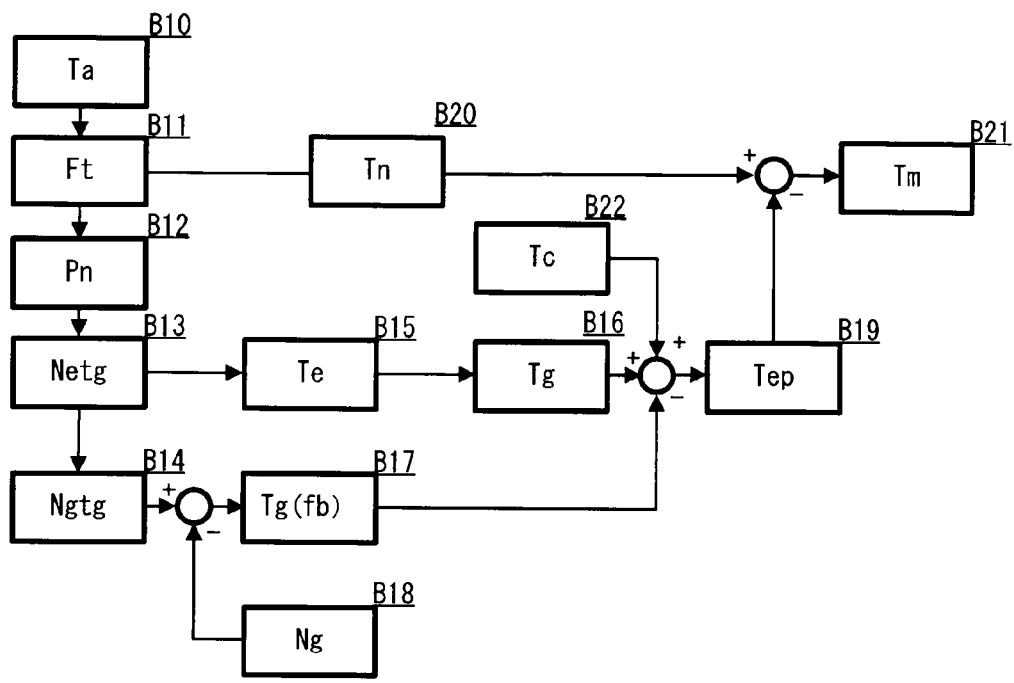
FIG. 17 is a control block diagram of the stepless speed change mode selected in the speed change control in FIG. 15.

On the other hand, if the clutch part temperature Tmpc is less than or equal to the upper limit value Tmpcth (the step S207: YES), the ECU 100 performs a clutch failure CVT mode (step S212). Now, with reference to FIG. 17, the details of the clutch failure CVT mode will be explained. FIG. 17 is another block diagram showing the stepless speed change control of the ECU 100. Incidentally, in FIG. 17, portions overlapping those of FIG. 16 will carry the same reference numerals, and the explanation thereof will be omitted as occasion demands.

In FIG. 17, the ECU 100 is configured such that a control block B22 is added to the basic control blocks in the stepless speed change associated with FIG. 16. In the control block B22, the clutch friction load torque Tc is added to the deviation which is obtained by subtracting the MG1 torque feedback value Tg(fb) calculated in the control block B17 from the MG1 torque Tg calculated in the control block B16. In other words, in the clutch failure CVT mode in FIG. 15, the amount of a reduction in the engine direct torque Tep by the clutch friction load torque Tc is compensated.

Explaining it more specifically, if the engine direct torque Tep is calculated in accordance with the basic control process shown in FIG. 16, a torque obtained by adding the clutch friction load torque Tc in addition to the inertia torque is subtracted from the MG1 torque Tg. Thus, the calculated engine direct torque Tep is reduced by the amount of the clutch friction load torque Tc. As a result, the MG2 torque Tm, which is calculated by subtracting the engine direct torque Tep from the drive shaft required torque Tn, deviates from an actually required value and is actualized as the torque variation of the drive shaft 600. If the influence of the clutch friction load torque Tc on the engine direct torque Tep is eliminated by the clutch failure CVT mode in the step S212 to which the control block B22 is added, the calculated engine direct torque Tep matches an actual control value. As a result, the torque variation of the drive shaft 600 is suppressed without the MG2 torque Tm deviating from the required amount. If the step S212 or the step S211 is performed, the process is moved to the step S206, and the selection of the optimal speed change mode based on the system efficiency is repeated. The speed change control is performed in the aforementioned manner.

Incidentally, in the block diagram shown in FIG. 17, if the clutch friction load torque Tc is zero in the added control block B22, then, it matches the block diagram of the normal CVT mode exemplified in FIG. 16. Therefore, the CVT mode may be performed in accordance with the block diagram shown in FIG. 17 all the time.

Figure 18:
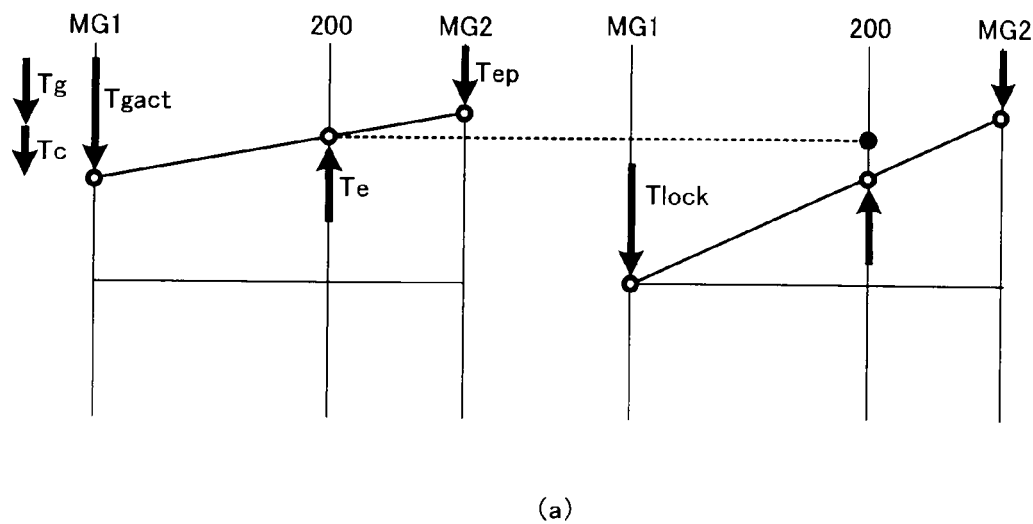
FIG. 18 are operational nomograms of the hybrid drive apparatus in FIG. 11.
Figure 18:
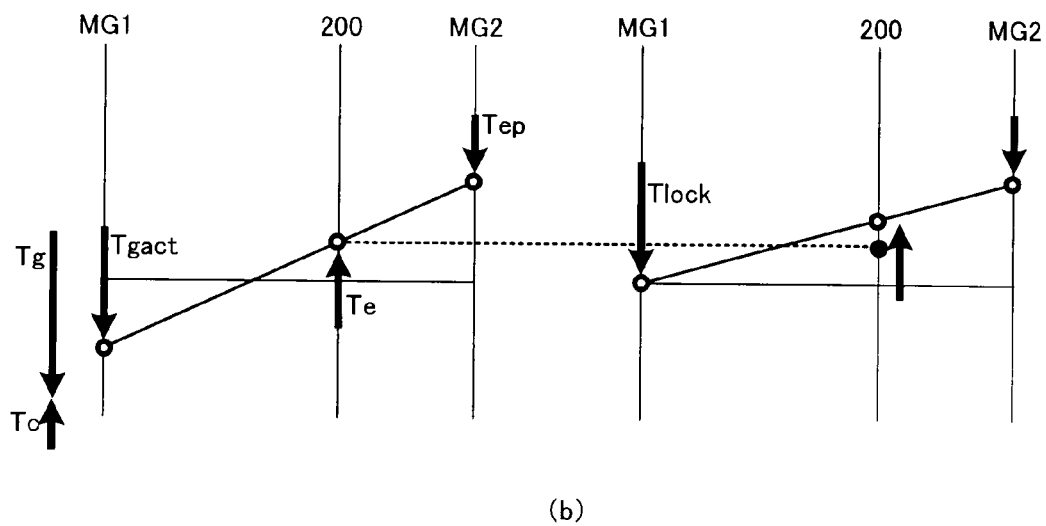

Now, with reference to FIG. 18, the comparison of the system efficiency in the step S206 and the selection of the speed change mode based on its comparison result will be complemented. FIG. 18 are operational nomograms of the hybrid drive apparatus 30. Incidentally, in FIG. 18, portions overlapping those of FIG. 4 will carry the same reference numerals, and the explanation thereof will be omitted as occasion demands.

In FIG. 18, FIG. 18(a) corresponds to the case where the MG1 is in the positive rotational area. The left side shows the CVT mode, and the right side shows the fixed speed change mode. In the CVT mode, as described above, since the operating point of the engine 200 is controlled to the optimal fuel economy operating point, the thermal efficiency ηe of the engine 200 is good. However, due to the influence of the clutch friction load torque Tc, the MG1 torque Tg as a power generation torque decreases, and the electric power balance of the battery 12 deteriorates. If the engine torque Te is increased to avoid the deterioration of the electric power balance, a fuel consumption amount increases, and the fuel economy or fuel consumption rate deteriorates.

On the other hand, if the fixed speed change mode is selected, as shown in the dashed line in FIG. 18(a), the operating point of the engine 200 changes from the operating point (black circle) at which the optimal fuel economy is given. Thus, in comparison with the CVT mode, the thermal efficiency ηe of the engine 200 is reduced, and the system efficiency ηsys is reduced. At each time, the ECU 100 compares the amount of the reduction in the system efficiency due to the deterioration of the electric power balance with the amount of the reduction in the system efficiency due to the reduction in the thermal efficiency, and it selects one of the speed change modes in which the system efficiency is higher. Incidentally, the same is true for a case where the MG1 is in the negative rotation state exemplified in FIG. 18(b).

Fourth Embodiment

In the aforementioned third embodiment, when the hybrid drive apparatus 30 adopts the fixed speed change mode, the MG1 is locked (accurately, the MG1 is locked via the sun gear S1 and the cam 910). However, the configuration of the hybrid drive apparatus in obtaining the fixed speed change mode is not limited to this type of MG1 locking. Now, with reference to FIG. 19, the configuration of another hybrid drive apparatus will be explained. FIG. 19 is a schematic configuration diagram conceptually showing the structure of a hybrid drive apparatus 40 in a fourth embodiment of the present invention. Incidentally, in FIG. 19, portions overlapping those of FIG. 11 will carry the same reference numerals, and the explanation thereof will be omitted as occasion demands.

In FIG. 19, the hybrid drive apparatus 40 has a different structure from that of the hybrid drive apparatus 30 in that it is provided with the power dividing mechanism 800 as another example of the "power transmission mechanism" of the present invention, instead of the power dividing mechanism 300. The power dividing mechanism 800 adopts the form of the so-called Ravigneaux-type planetary gear mechanism, provided with the first planetary gear mechanism 810 of a single pinion gear type and the second planetary gear mechanism 820 of a double pinion type, as a differential mechanism made of a plurality of rotational elements.

The first planetary gear mechanism 810 is provided with: the sun gear 811; the carrier 812; the ring gear 813; and the pinion gear 814 meshing with the sun gear 811 and the ring gear 813, which is held by the carrier 812 so as to rotate on its axis in the axial direction and to revolve due to the rotation of the carrier 812. The rotor of the motor generator MG1 is coupled with the sun gear 811, the input shaft 500 is coupled with the carrier 812, and the drive shaft 600 is coupled with the ring gear 813.

The second planetary gear mechanism 820 is provided with: the sun gear 821; the carrier 822; the ring gear 823; and the pinion gear 824 meshing with the ring gear 823 and the pinion gear 825 meshing with the sun gear 821, each of which is held by the carrier 822 so as to rotate on its axis in the axial direction and to revolve due to the rotation of the carrier 822. The cam 910 (not illustrated) of the locking mechanism 900 is coupled with the sun gear 821. In other words, in the embodiment, the sun gear 821 functions as another example of the "first rotational element" of the present invention.

As described above, the power dividing mechanism 800 is provided with four rotational elements in total, which are on the whole the first rotational element group composed of the sun gear 811 of the first planetary gear mechanism 810, the sun gear 821 (first rotational element) of the second planetary gear mechanism 820, the carrier 812 of the first planetary gear mechanism 810 and the ring gear 823 of the second planetary mechanism 820 which are coupled with each other, and the second rotational element group composed of the ring gear 813 of the first planetary gear mechanism 810 and the carrier 822 of the second planetary gear mechanism 820 which are coupled with each other.

According to the hybrid drive apparatus 40, if the sun gear 821 becomes in the lock state and its rotational speed becomes zero, then, the second rotational element group having a rotational speed uniquely meaning the vehicle speed V and the sun gear 821 define the rotational speed of the first rotational element group as the remaining one rotational element. The carrier 812 which constitutes the first rotational element group is coupled with the input shaft 500 coupled with the crankshaft 205 of the engine 200 (not illustrated). Thus, in the end, the engine rotational speed NE of the engine 200 has a unique relation with the vehicle speed V, and the fixed speed change mode is realized. As described above, the fixed speed change mode can be realized in the configuration other than the hybrid drive apparatus 40. In accordance with that, the lock target of the locking mechanism 900 may be changed as occasion demands. In any case, as in the third embodiment, it is possible to provide the calculation of the drag torque in the locking mechanism 900 and the optimal drive control which takes into account the calculated drag torque.

The present invention is not limited to the aforementioned embodiments, but various changes may be made, if desired, without departing from the essence or spirit of the invention which can be read from the claims and the entire specification. A control apparatus for a hybrid vehicle, which involves such changes, is also intended to be within the technical scope of the present invention.

INDUSTRIAL APPLICABILITY

The present invention can be applied to a hybrid vehicle in which the speed change mode can be changed between the stepless speed change mode and the fixed speed change mode.

DESCRIPTION OF REFERENCE CODES

1 hybrid vehicle
10 hybrid drive apparatus
20 hybrid drive apparatus
30 hybrid drive apparatus
40 hybrid drive apparatus
100 ECU
200 engine
201 cylinder
203 piston
205 crankshaft
300 power dividing mechanism
MG1 motor generator
MG2 motor generator
400 brake mechanism
500 input shaft
600 drive shaft
700 reduction gear mechanism
800 power dividing mechanism
900 locking mechanism

The invention claimed is:

1. A control apparatus for a hybrid vehicle,
the hybrid vehicle comprising:
a power element including a rotating electrical machine and an internal combustion engine;
a power transmission mechanism comprising a plurality of rotational elements which mutually perform differential operation and which include a first rotational element capable of adjusting a rotational speed by using the rotating electrical machine, a second rotational element coupled with a drive shaft connected to an axle, and a third rotational element coupled with the internal combustion engine; and
a locking mechanism capable of changing a state of the first rotational element between a lock state in which the first rotational element cannot rotate and a non-lock state in which the first rotational element can rotate,
wherein the power transmission mechanism is configured such that the rotating electrical machine functions as a reaction element that provides a reaction torque to the internal combustion engine, and
the hybrid vehicle is configured such that a speed change mode is configured to be switched between a stepless speed change mode and a fixed speed change mode, the stepless speed change mode being a mode in which the first rotational element is in the non-lock state such that a transmission gear ratio, a ratio between a rotational speed of the internal combustion engine and a rotational speed of the drive shaft, is continuously variable, the fixed speed change mode being a mode in which the first rotational element is in the lock state such that the transmission gear ratio is fixed, and
said control apparatus comprising:
an operating condition specifying device that specifies an operating condition of the power element, including a torque of at least one of the rotating electrical machine and the internal combustion engine; and
a judging device that judges whether or not there is a drag torque in the locking mechanism on the basis of the specified operating condition.

2. The control apparatus for the hybrid vehicle according to claim 1, wherein
said operating condition specifying device specifies a torque of the rotating electrical machine as one operating condition from a control amount of the rotating electrical machine and specifies a torque of the rotating electrical machine as another operating condition from an operating condition of the hybrid vehicle which correlates with the torque of the rotating electrical machine and which includes at least one of a required torque and a required output of the hybrid vehicle, and
if the torque of the rotating electrical machine specified from the control amount of the rotating electrical machine is set to a first torque and if the torque of the rotating electrical machine specified from the operating condition of the hybrid vehicle is set to be a second torque, said judging device judges whether or not there is a drag torque on the basis of the specified first and second torques.

3. The control apparatus for the hybrid vehicle according to claim 2, wherein said judging device judges that a drag torque is generated when the specified first torque is greater than the specified second torque if the rotating electrical machine is in a positive rotation state and when the specified first torque is less than the second torque if the rotating electrical machine is in a negative rotation state.

4. The control apparatus for the hybrid vehicle according to claim 1, comprising:
- a shift amount specifying device that specifies an amount of a shift in the operating condition of the power element caused by a drag torque, with respect to a normal case, if it is judged that a drag torque is generated; and
- a second controlling device that controls at least one of a reduction torque and a cranking torque of the internal combustion engine in accordance with the specified amount of the shift.

5. The control apparatus for the hybrid vehicle according to claim 1, comprising:
- a third controlling device that controls a torque of the rotating electrical machine in accordance with a deviation between the rotational speed of the internal combustion engine and the target rotational speed such that the rotational speed of the rotating electrical machine converges on the target rotational speed when the stepless speed change mode is selected; and
- a calculating device that calculates a drag torque on the basis of a feedback value of the torque of the rotating electrical machine when the rotating electrical machine is controlled in accordance with the deviation and a value of an inertial torque caused by inertia of a rotational inertia system including the power element when the rotating electrical machine is controlled in accordance with the deviation, wherein
- said operating condition specifying device specifies the feedback value and the value of the inertial torque as the operation condition, and
- said judging device judges whether or not there is a drag torque in the locking mechanism on the basis of the calculated drag torque.

6. The control apparatus for the hybrid vehicle according to claim 5, further comprising another judging device that judges a state of locking mechanism on the basis of the calculated drag torque.

7. The control apparatus for the hybrid vehicle according to claim 6, wherein said another judging device judges that the locking mechanism is in a failure state if the calculated drag torque is greater than or equal to a predetermined value.

8. The control apparatus for the hybrid vehicle according to claim 5, further comprising a correcting device that corrects an output torque of the drive shaft in accordance with the calculated drag torque.

9. The control apparatus for the hybrid vehicle according to claim 5, further comprising a selecting device that selects one of the stepless speed change mode and the fixed speed change mode on the basis of the calculated drag torque.

10. The control apparatus for the hybrid vehicle according to claim 9, wherein said selecting device selects a mode having a higher system efficiency of the hybrid vehicle from the stepless speed change mode and the fixed speed change mode.

11. The control apparatus for the hybrid vehicle according to claim 5, further comprising another rotating electrical machine which is different from the rotating electrical machine and which can perform power input/output with the drive shaft.

* * * * *